United States Patent
Hasegawa et al.

(10) Patent No.: US 6,513,038 B1
(45) Date of Patent: Jan. 28, 2003

(54) SCHEME FOR ACCESSING DATA MANAGEMENT DIRECTORY

(75) Inventors: Yasushi Hasegawa, Yokohama (JP); Giichi Kishimoto, Yokohama (JP); Hideaki Takeda, Yokohama (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 0 days.

(21) Appl. No.: 09/411,485

(22) Filed: Oct. 1, 1999

(30) Foreign Application Priority Data

Oct. 2, 1998 (JP) ............................................ 10-281743

(51) Int. Cl.⁷ ........................... G06F 17/30; G06F 17/00
(52) U.S. Cl. .............................. 707/7; 707/101; 707/201
(58) Field of Search ........................ 707/1–8, 100–104, 707/200–201, 205, 500–501, 513, 514, 526–531

(56) References Cited

U.S. PATENT DOCUMENTS 6,016,499 A * 1/2000 Ferguson ..................... 707/104
6,175,836 B1 * 1/2001 Aldren ......................... 707/103

* cited by examiner

*Primary Examiner*—Alford W. Kindred
(74) *Attorney, Agent, or Firm*—Kilpatrick Stockton LLP

(57) ABSTRACT

There is disclosed a scheme for accessing data management directory which is capable of achieving easy and flexible data access which are managed in substantial directories from respective applications by constructing substantial directories which sort and manage the location of data accumulated on the network and access information independently from the applications, and then sharing and integrating a group of these substantial directories to show a directory structure which is easy for the applications to utilize. In this scheme for accessing data management directory, a view search instruction for manipulating data, which is defined by a combination of arbitrary class and attribute requested by an application is inputted; the view search instruction is translated into a directory manipulation instruction for manipulating one or a plurality of substantial directories, according to a predetermined view definition; entries are extracted from the substantial directories using the directory manipulation instruction to derive an entry set; and a directory customized corresponding to the view search instruction of the application is generated based on a combination of the class and the attribute as a result of the set operation, by applying a set operation defined in the view definition to the entry set.

36 Claims, 30 Drawing Sheets

FIG.8
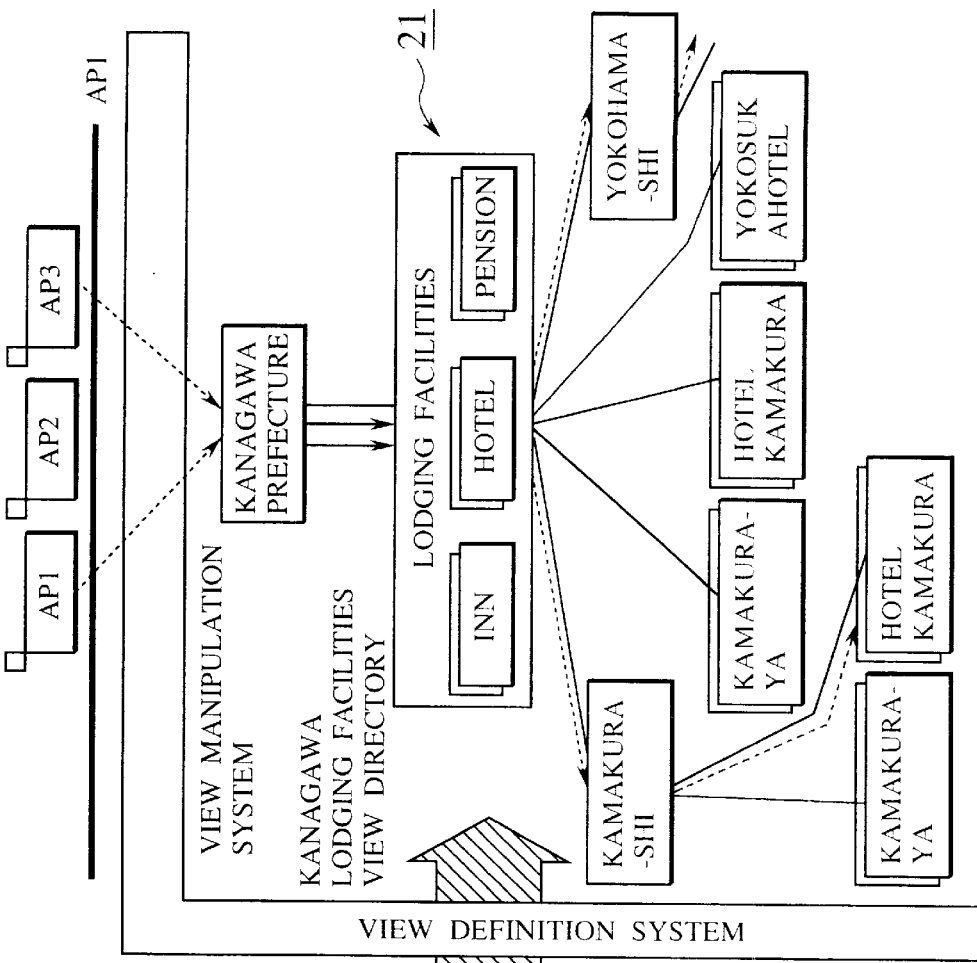
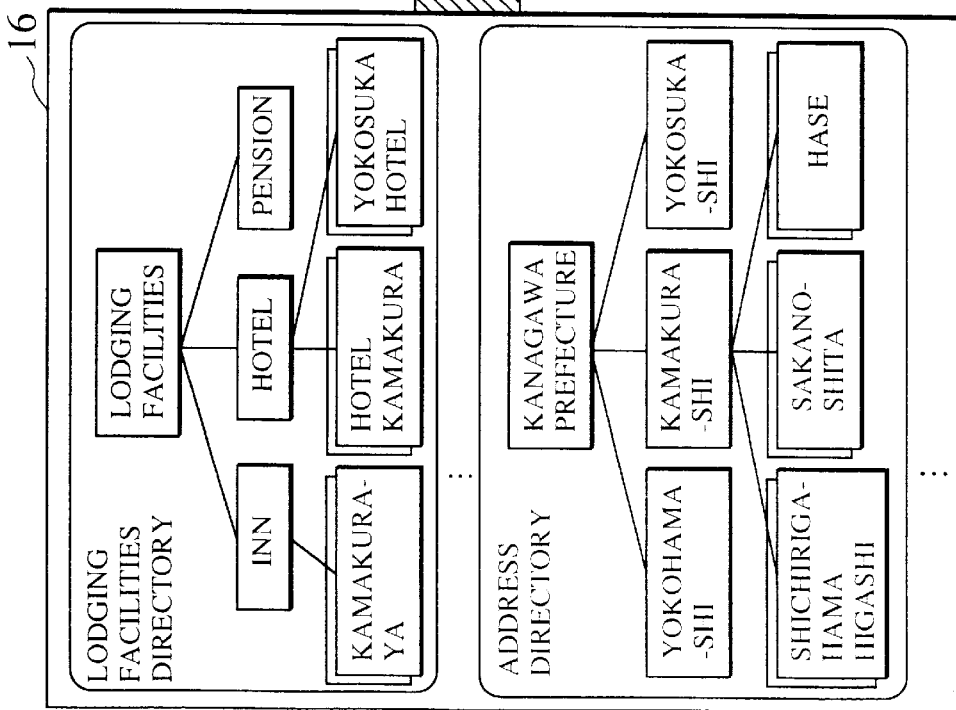

FIG. 9

```
<view_definition>::=<top_word><create_view_name><select_operator> '('
              <operate_dir_name>
              <project_base>
              <select_condition>
              <project_attrs>
              ')'

<top_word>::='define view'
<create_view_name>::={<CHARACTER>}···/*VIEW DEFINITION NAME TO BE DEFINED*/
/*RULE: UNIQUE NAME IN WHOLE CDIR SYSTEM*/
<select_operator>::='as cdir_select'

<operate_dir_name>::='dir:'<dir_name>
<dir_name>::=<real_dir_name> | <view_def_name>
<real_dir_name>::={<CHARACTER>}···   /*REAL DIRECTORY NAME
                                    :THE NAME DEFINED IN DIRECTORY DEFINITION*/
<view_def_name>::={<CHARACTER>}···   /*PREVIOUSLY DEFINED VIEW DEFINITION
                                         NAME*/

<project_base>::='base:'<dir_dn>
<dir_dn>::={<CHARACTER>}···          /*IDENTIFIER OF THE
 BASE ENTRY IN PROJECTION OPERATION:REAL DIRECTORY VALUE*/

<select_condition>::='condition:"(null)' |      /*NO SELECTION CONDITION*/
                    'condition:"('<condition_list>')'
<condition_list>::=<class_condition> | <class_condition>'conj:'<or><condition_list>
/*RULE:PLURAL CONDITION LISTS FOR CLASSES ARE COMBINED BY
  LOGICAL SUM ONLY*/
/*CONSTRAINT:COMBINATION OF LOGICAL PRODUCT IS NOT ALLOWED*/

<not>::=' ! '
<or>::=' | '
<and-or>::='&' | ' | '
<class_condition>::=[<not>]'("class:'<class_name>'attr:'<attr_condition_list>')'
<class_name>::={<CHARACTER>}···      /*CLASS NAME:THE NAME DEFINED IN
                                          DIRECTORY DEFINITION*/

<attr_condition_list>::= '('<attr_condition>')' | '('<and_or> <attr_condition_list>··· ')'
<attr_condition>::=   <attr_predicate> | <not>'('<attr_predicate>')'

<attr_predicate>::=   <attr_name>'operator:'<COMPARE operator>'value:'<COMPARE value>
                    | <attr_name>'operator:'<equal>'value:'<COMPARE value >
                    | <attr_name>'operator:'<equal>'value:'<astar >

<attr_name>::={<CHARACTER>}···       /*ATTRIBUTE NAME:THE NAME DEFINED IN
                                          DIRECTORY DEFINITION*/
<COMPARE operator>::='>=' | '<='
<equal>::='='
<astar>::='*'
<COMPARE value>::=<CONSTANT> | *<CONSTANT>* | *<CONSTANT> | <CONSTANT>*

<CONSTANT>::={<CHARACTER>}···
/*CONSTRAINT:FOLLOWING CHARACTERS CANNOT BE USED FOR <CHARACTER>*/
/*           ',',+,'=','"',<CR>,'<','>','#',';','(',')','[',']','&','*'.   */

/*CONSTRAINT:FOLLOWING CASE IS PROHIBITED FOR <CONSTANT>*/
/*(1)IN CASE OF FOLLOWING RESERVED WORDS
    'define','view','dir:','condition:','as','cdir_select','class:','attr:','operator:','value:','base:','attrs:',
    'cdir_union' */
/*(2)IN CASE OF TOP OF THE CHARACTER OR INCLUDING SPACE AT
    THE BOTTOM*/
/*(3)IN CASE OF CHARACTER INCLUDING CONTINUING SPACES*/

/*CONSTRAINT:FOLLOWING CASE IS PROHIBITED FOR <COMPARE value>*/
/*(1)SPACE BETWEEN '*' AND '<CONSTANT>'*/

<project_attrs>::='attrs:"(null)'  /*ALL ATTRIBUTES DEGIGNATED*/
                | 'attrs:"('attrs_group)··· ')'
<attrs_group>::=[<not>]'("class:'<class_name>[<class_attr_list>]')'
<class_attr_list>::={  'attr:'<attr_name>}···
```

FIG.10

```
<view_definition>::=<top_word><view_def_name><union_operation>'(
          <main_union_dir>
          <sub_union_dir>
          ')'
<main_union_dir>::='('<union_dir><union_entry>')' |
                   '('<union_dir><project_attrs>')'
                                    /*MAIN DIRECTORY IN WHICH
                                       ATTRIBUTE IS OBTAINED*/
<union_dir>::=  <operate_dir_name>[<project_base>]
          /*<project_base> CANNOT BE DEFINED WHEN
            <union_entry> IS SELECTED IN <main_union_dir>*/

<sub_union_dir>::='('<union_dir>[<union_condition>]')'
                                    /*SUB DIRECTORY IN WHICH
                                       ATTRIBUTE IS NOT
                                       OBTAINED*/
          /*<union_condition> CANNOT BE DEFINED WHEN
            <union_entry> IS SELECTED IN <main_union_dir>*/

<union_condition>::='condition:'(null)' | 'condition:'<check_attrs_group>
<check_attrs_group>::={'('class:<class_name> <check_class_attr_list>')'}···
<check_class_attr_list>::={'attrs:'<attr_name>}···
```

FIG.12A

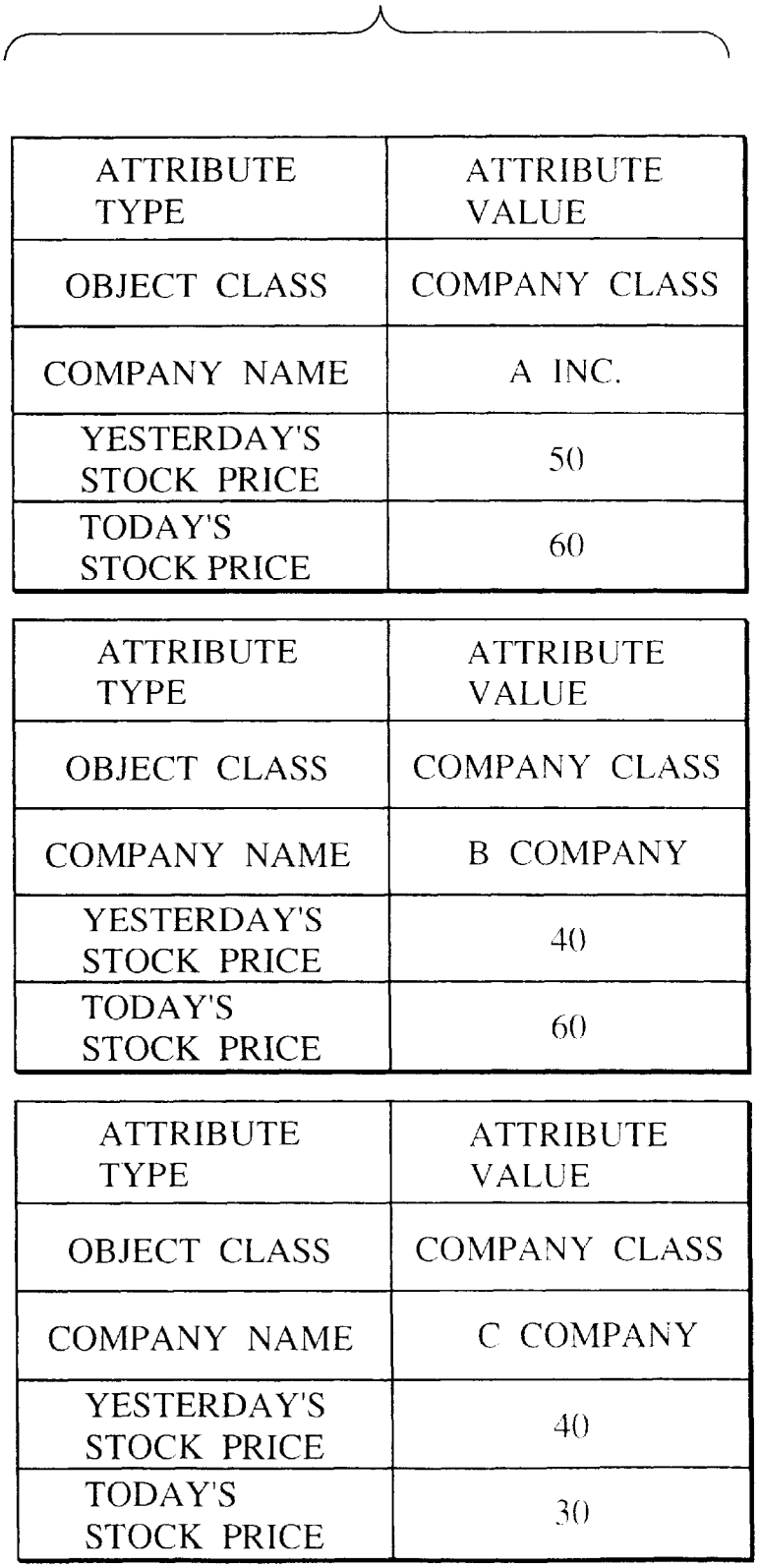

| ATTRIBUTE TYPE | ATTRIBUTE VALUE |
|---|---|
| OBJECT CLASS | COMPANY CLASS |
| COMPANY NAME | A INC. |
| YESTERDAY'S STOCK PRICE | 50 |
| TODAY'S STOCK PRICE | 60 |

| ATTRIBUTE TYPE | ATTRIBUTE VALUE |
|---|---|
| OBJECT CLASS | COMPANY CLASS |
| COMPANY NAME | B COMPANY |
| YESTERDAY'S STOCK PRICE | 40 |
| TODAY'S STOCK PRICE | 60 |

| ATTRIBUTE TYPE | ATTRIBUTE VALUE |
|---|---|
| OBJECT CLASS | COMPANY CLASS |
| COMPANY NAME | C COMPANY |
| YESTERDAY'S STOCK PRICE | 40 |
| TODAY'S STOCK PRICE | 30 |

FIG.12B

| ATTRIBUTE TYPE | ATTRIBUTE VALUE |
|---|---|
| OBJECT CLASS | STAFF CLASS |
| GENERAL NAME | JIRO TANAKA |
| PHONE NUMBER | 012-345-6789 |
| CUSTOMER | B COMPANY |

| ATTRIBUTE TYPE | ATTRIBUTE VALUE |
|---|---|
| OBJECT CLASS | STAFF CLASS |
| GENERAL NAME | HANAKO SATO |
| PHONE NUMBER | 012-345-6789 |
| CUSTOMER | C COMPANY |

| ATTRIBUTE TYPE | ATTRIBUTE VALUE |
|---|---|
| OBJECT CLASS | STAFF CLASS |
| GENERAL NAME | SABURO YAMADA |
| PHONE NUMBER | 012-345-6789 |
| CUSTOMER | B COMPANY, C COMPANY |

FIG.15

Ldap(BASEDN,SCOPE,FILTER)

SEARCH BASE
Ldap(
BASEDN:cn=A INC.,cn=ENTERPRISE,cn=ROOT
SCOPE:BASE,
FILTER:null
)
⇒ ENTRY ATTRIBUTE :
cn=A INC.,cn=ENTERPRISE,cn=ROOT
} 151

SEARCH ONE LEVEL
Ldap(
BASEDN:cn=A INC.,cn=ENTERPRISE,cn=ROOT
SCOPE:ONE LEVEL,
FILTER:RDN=*SALES*
)
⇒ ENTRY ATTRIBUTE :
cn=SALES,cn=A INC.,cn=ENTERPRISE,cn=ROOT
} 152

SEARCH SUBTREE
Ldap(
BASEDN:cn=A INC.,cn=ENTERPRISE,cn=ROOT
SCOPE:SUBTREE,
FILTER:RDN=*YAMADA*
)
⇒ ENTRY ATTRIBUTE :
cn=SABURO YAMADA,cn=SALES,cn=A INC.,cn=ENTERPRISE,
cn=ROOT
cn=SABURO YAMADA,cn=DEVELOPMENT,cn=A INC.,
cn=ENTERPRISE,cn=ROOT
} 153

FIG.18

VIEW DEFINITION SYNTAX OF UNION OPERATION

IDENTIFIER OF UNION OPERATION OBJECT ENTRY:
  cn=A INC.,cn=ENTERPRISE,cn=ROOT

VIEW DEFINITION SYNTAX:
  define view ENTERPRISE ALL DIVISION VIEW as union(
    dir=ENTERPRISE DIRECTORY
    base=cn=A INC.,cn=ENTERPRISE,cn=ROOT
    dir=A INC. SALES DIVISION DIRECTORY
  )

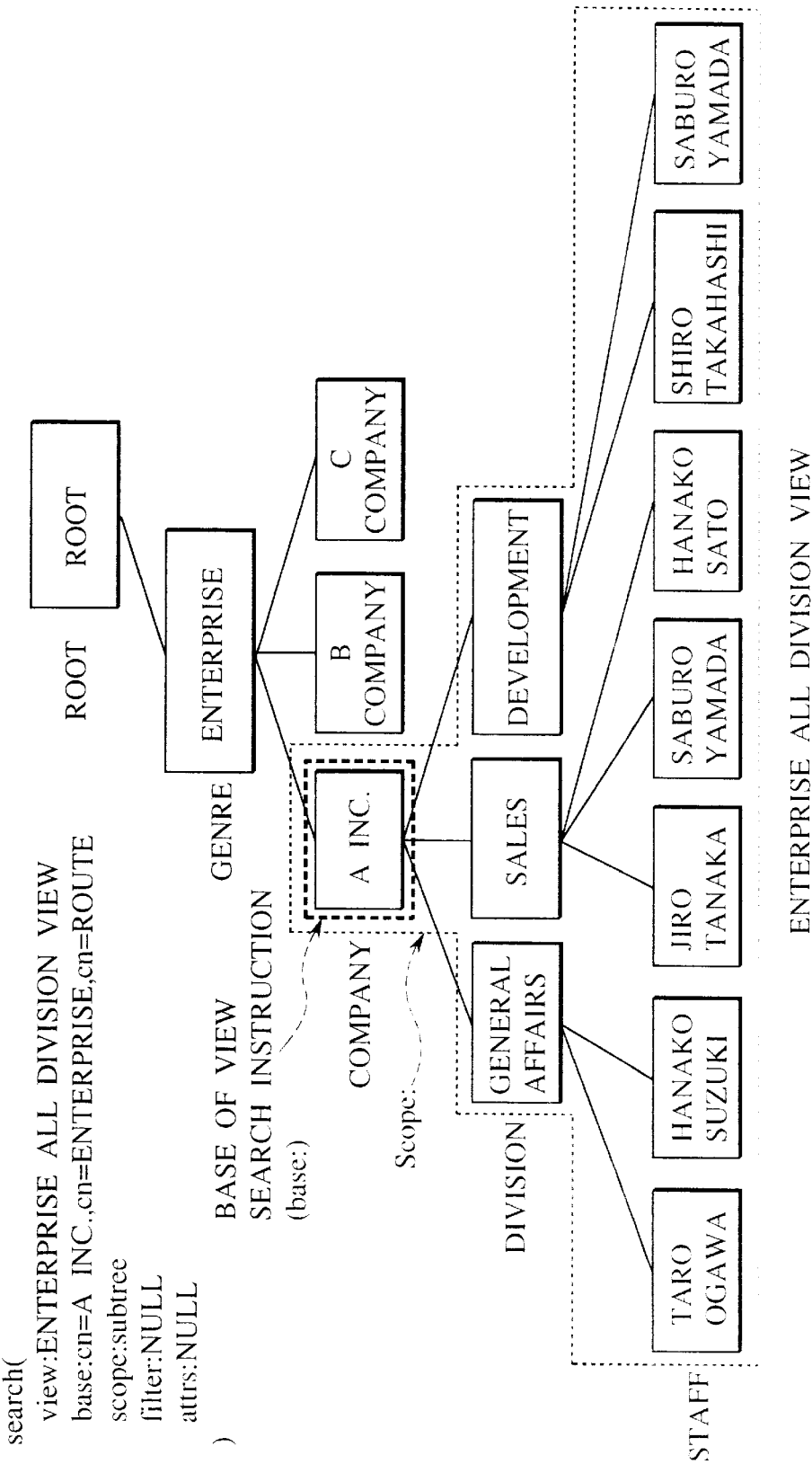

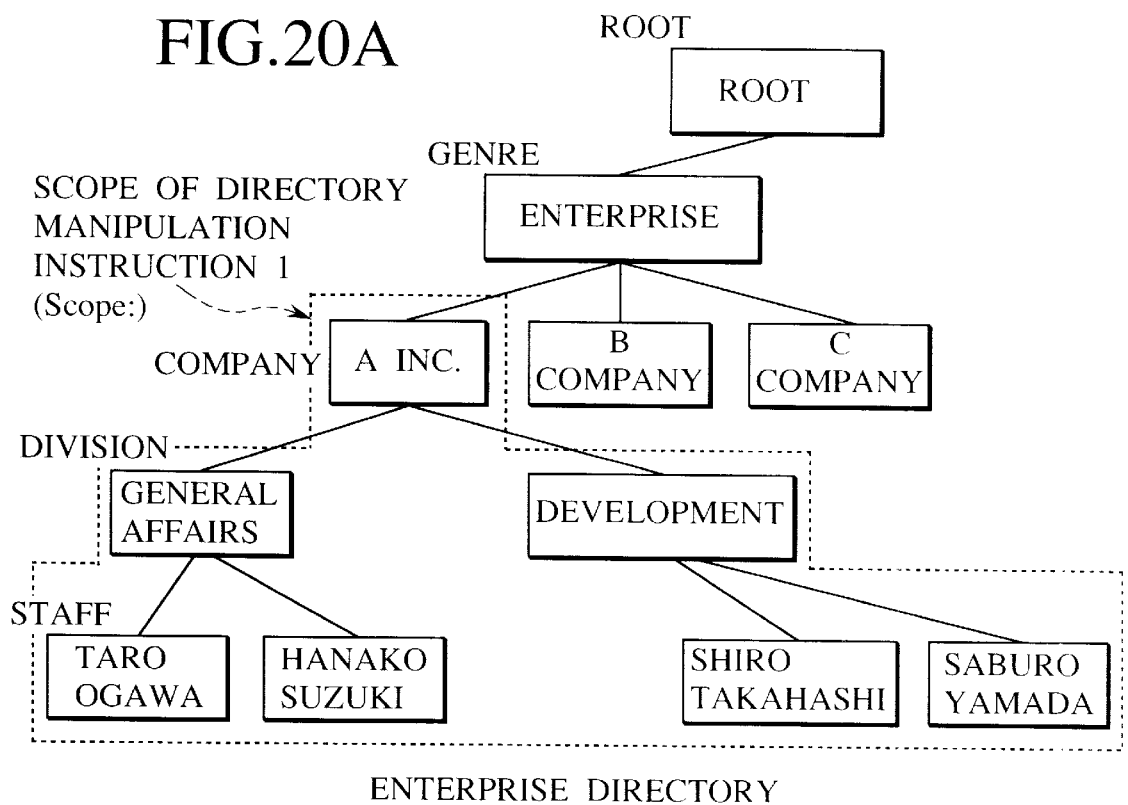
ENTERPRISE DIRECTORY
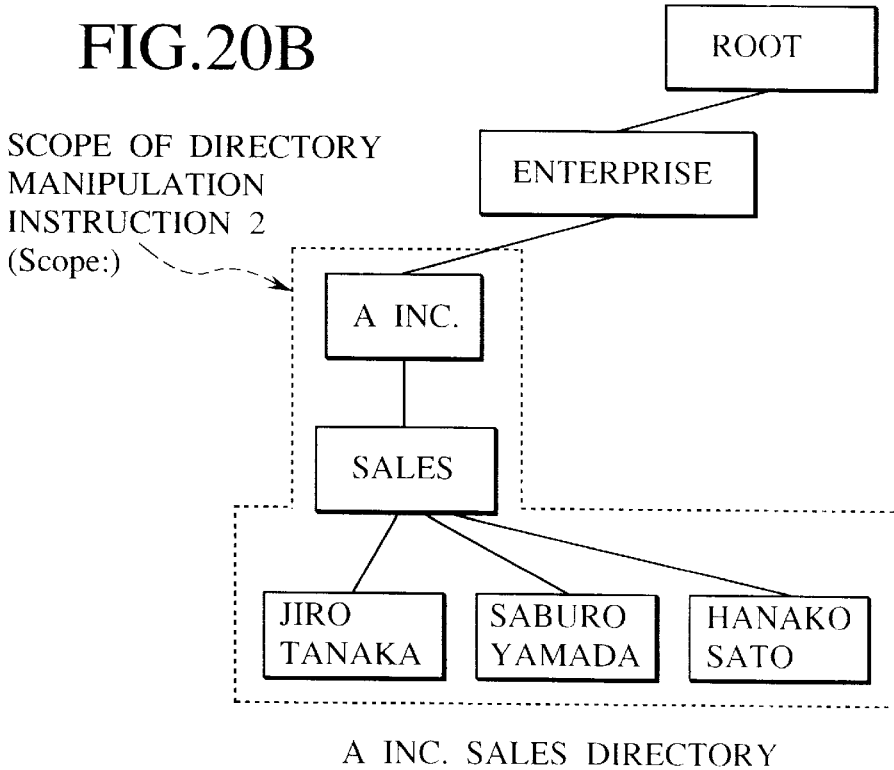
A INC. SALES DIRECTORY

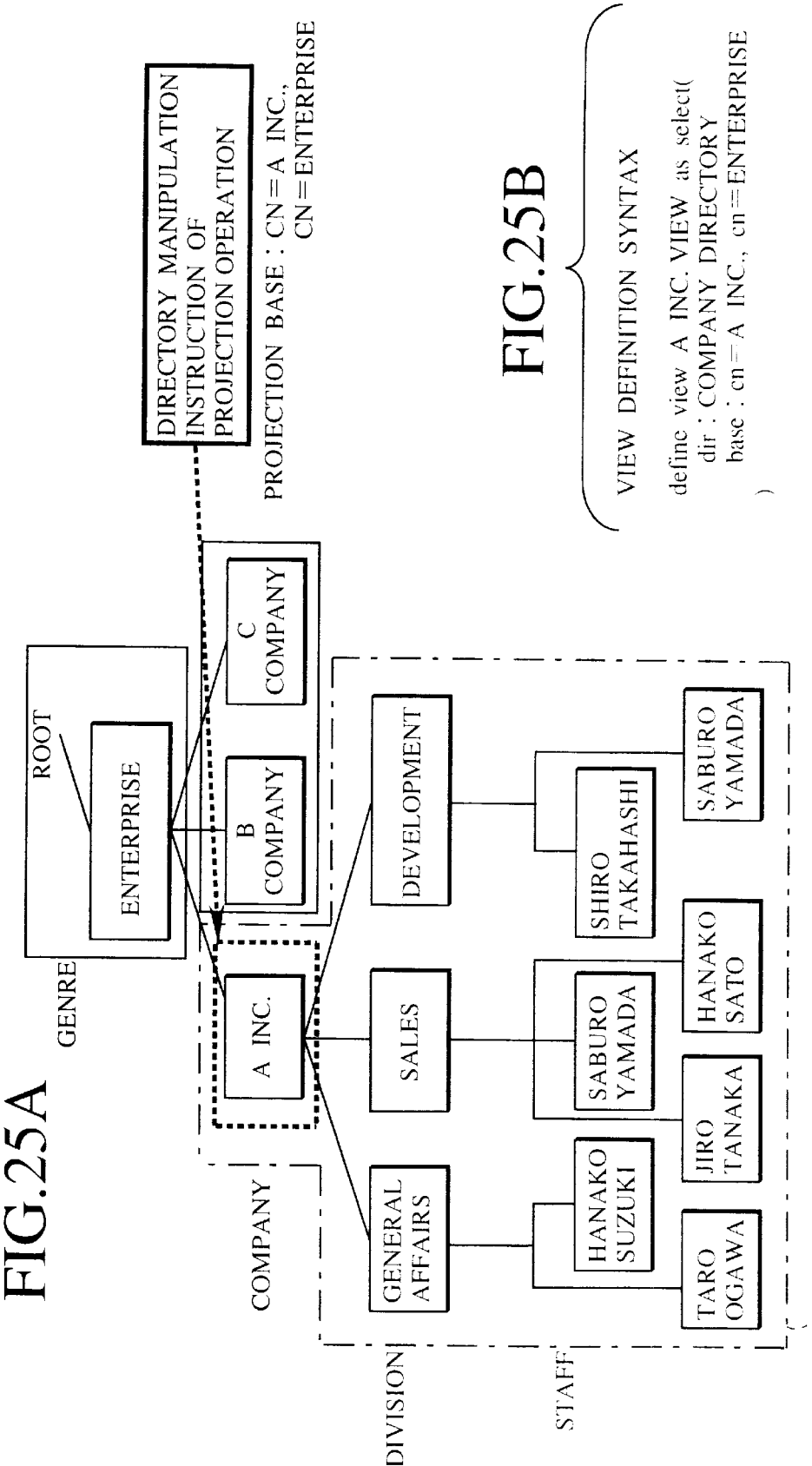

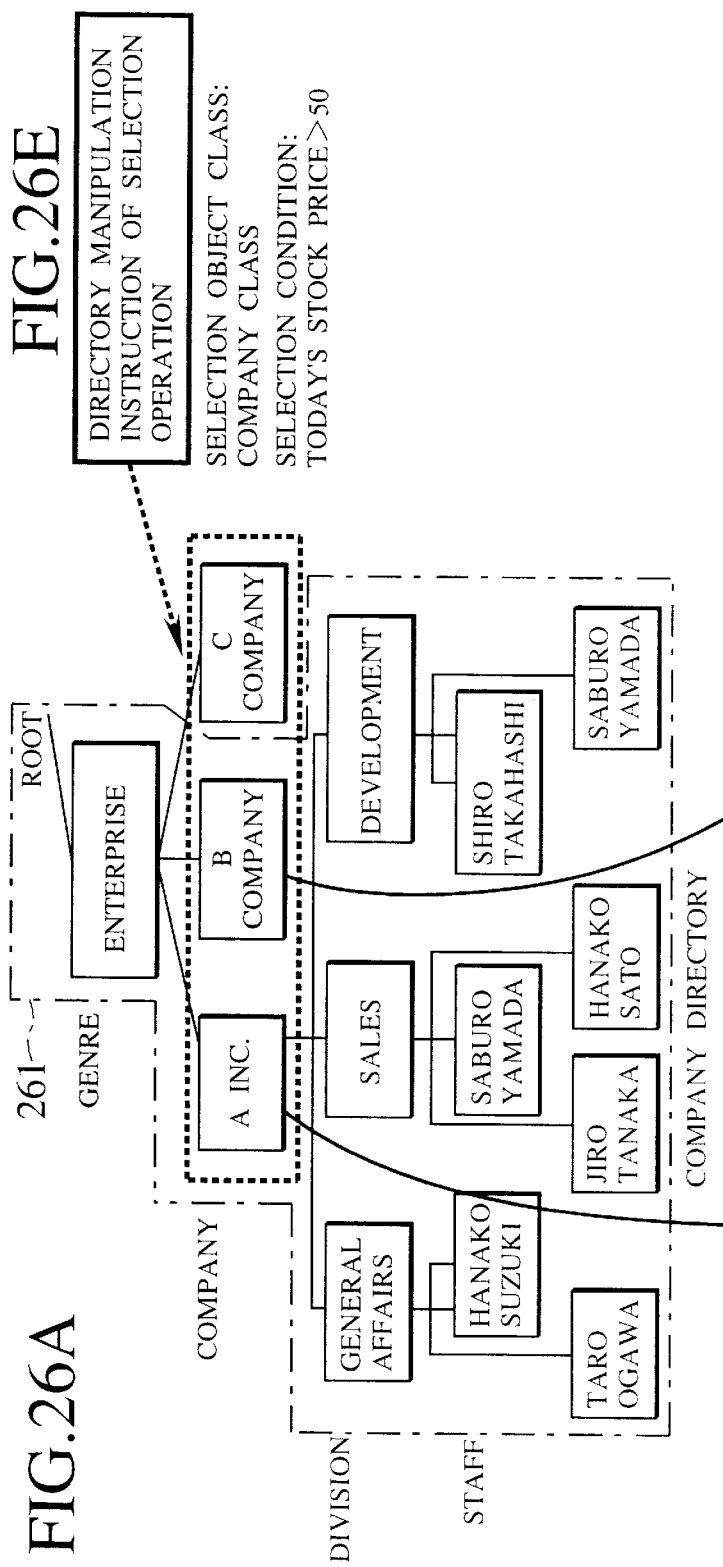

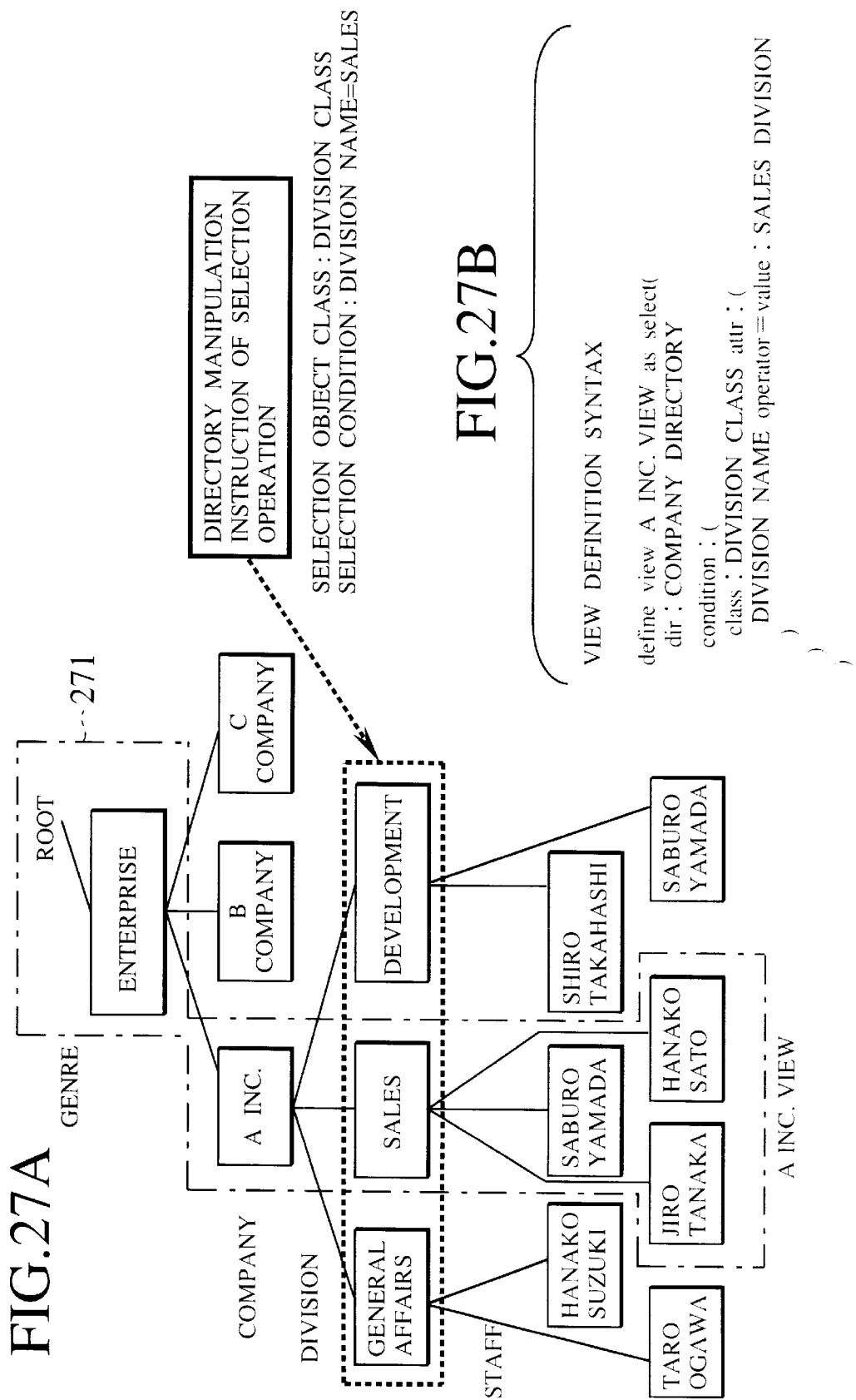

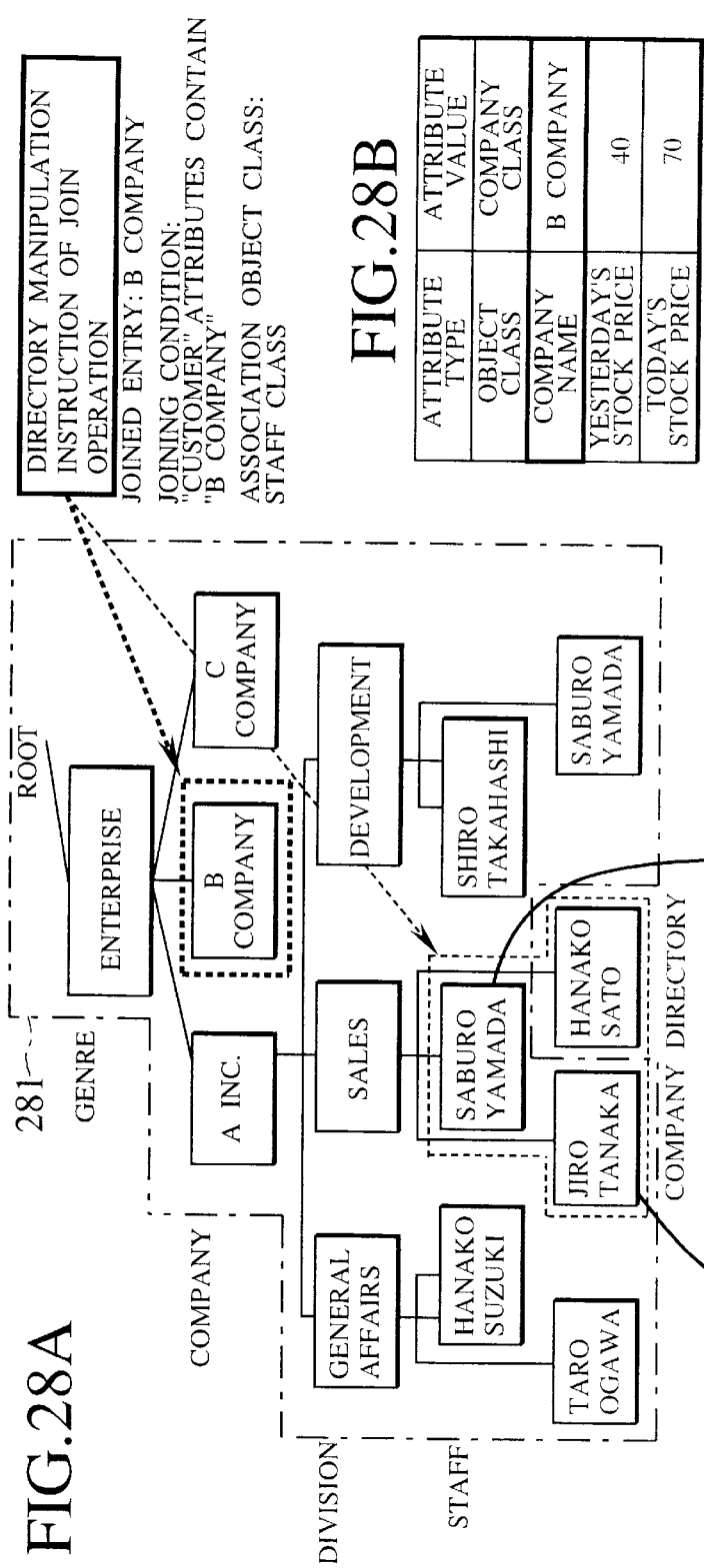

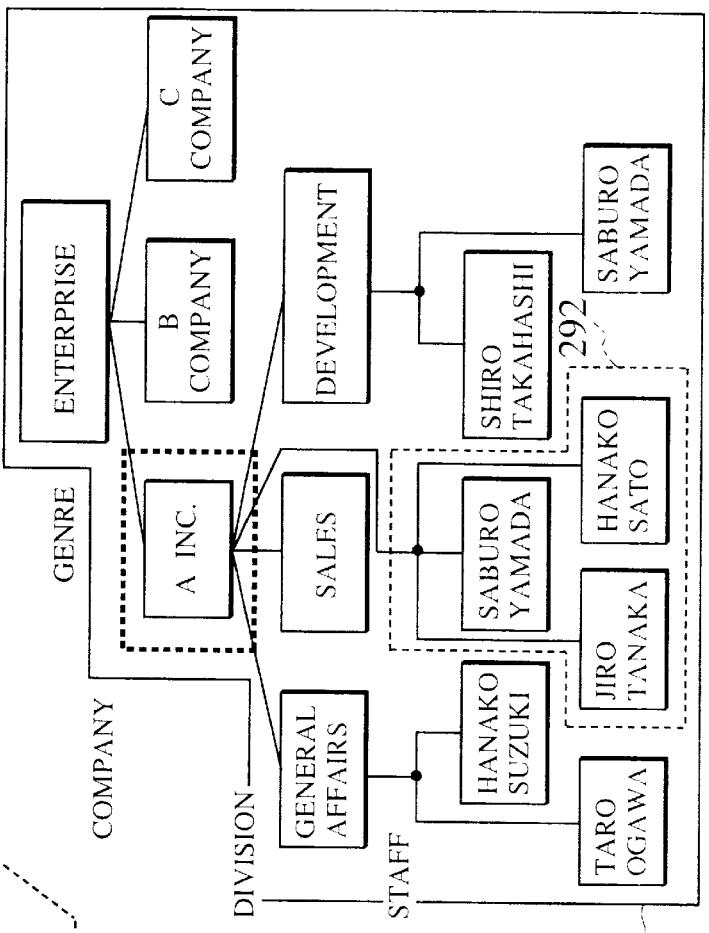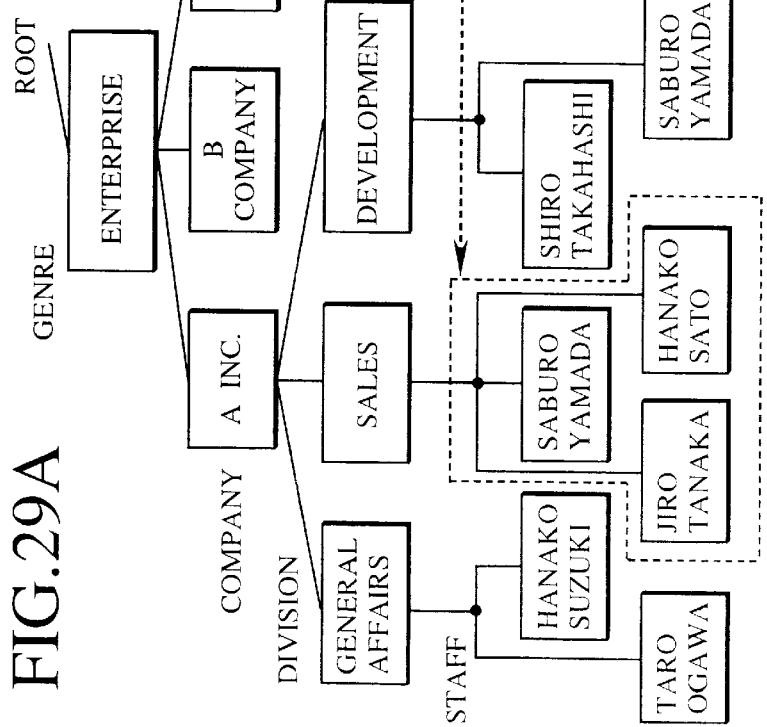

SCHEME FOR ACCESSING DATA MANAGEMENT DIRECTORY

BACKGROUND OF THE INVENTION

1. Field of the Invention

The present invention relates to a scheme for accessing data management directory. More particularly, the present invention relates to directory utilizing technology which is capable of achieving easy and flexible data access, which are managed by substantial directories of respective applications, so as to attain high level utilization of the substantial directories, by constructing substantial directories which sort and manage the location of data (contents) accumulated on the network and access information for the data, independently from applications and then sharing and integrating a group of these substantial directories to show directory structures which are easy to utilize for individual applications.

2. Description of the Background Art

In recent years, data (contents) accumulated on the network go on increasing.

The location of data and access information on the network are sorted and managed by the directory. According to the provisions of X.500, the directory means a system or a service which saves systematically various information of communication and is utilized commonly a large number of users. More particularly, the directory is the sorting tree which connects the data serving as nodes by the hierarchical tree structure to manage them. For example, the data (contents) in the particular fields such as address, map, eating place, lodging facilities, etc. on the network such as the Internet are sorted and managed by the directories such as address directory, map directory, eating place directory, lodging facilities directory, etc. respectively.

However, in the directory accessing approach in the conventional art, there are problems described in the following. That is, the directory which manages the location of the data accumulated on the network and the access information is constructed to be bound to individual applications. Thus, since there exists no basic distributing basis of the data which are managed by these directories, the access to such data is limited to the particular applications. Therefore, it is difficult to share the directories in a plurality of applications in order to refer the location of the data which are managed by the directories, or integrate data management information of a plurality of directories. For example, a directory type information guidance service for managing URLs of the multimedia contents is provided in many directory type search sites on the Internet. However, only the information offering service which is effected by the local directory available for only the particular individual system (application) is provided individually in these sites. In other words, since the directory and the application are constructed as the integrated form, it is difficult to employ transversely and integratedly in plural sites both the directories being provided by individual services and the data being managed by these directories. While, for the purpose of facilitation of the load distribution of the data processing and the backup at the time of data fault, the technique of constructing the copy of the directories and splitting the directory tree structure into a plurality of partial tree structures has been known, but the directory structure per se cannot be changed by this technology.

Essentially, for the purpose of common use in many users, the directories and the data being managed in the directories save the information systematically for various purposes, nevertheless the directories which are easily available in response to the purpose for individual applications have not been provided.

In addition, a hierarchical structure of the original directory information is needed in order to utilize the data in a plurality of sites integrally, and thus the hierarchical structure and the information contained therein must be integrated together while keeping this hierarchical structure. However, in the conventional art, necessary information is acquired from the directories having the hierarchical structure only as the set of flat values.

SUMMARY OF THE INVENTION

The present invention has been made to overcome the above problems in the conventional art. It is an object of the present invention to provide a scheme for accessing data management directory, which is capable of constructing the directories, which sort and manage the location of data accumulated on the network and access information, independently from applications and also achieving an easy and flexible access to data which are managed by the actual (substantial) directories from respective applications for the various purposes, by providing a view function for showing actual directories as directory structures which are easy for individual applications to utilize by sharing, dividing and integrating the actual directories.

In other words, the present invention provides a scheme for accessing data management directory which provides a virtual directory hierarchical structure which is customized every application, e.g., (1) to extract the only data, which are requested by the application, from the substantial directories, (2) to simplify the manipulation of the related information between a plurality of directories, (3) to conceal the directory hierarchies, which are out of the search scope, for the purpose of the security protection, etc.

View function for the directory can be implemented by view directory generated by carrying out various set operations using the relational algebra with respect to one or plural substantial directories to be manipulated in class unit, entry unit and attribute unit.

According to an aspect of the present invention, there is provided a method of accessing a substantial directory for sorting and managing data, comprising the steps of: (a) inputting a view search instruction for manipulating data, which is defined by a combination of arbitrary class and attribute requested by an application; (b) translating the view search instruction into a directory manipulation instruction for manipulating one or a plurality of substantial directories according to a prescribed view definition; (c) extracting entries from the substantial directories using the directory manipulation instruction to derive an entry set; and (d) generating a customized directory corresponding to the view search instruction of the application according to a combination of the class and the attribute as a result of a set operation, by applying the set operation defined in the view definition to the entry set.

According to another aspect of the present invention, there is provided a method of accessing a substantial directory for sorting and managing data which joins entries which stores sets of attribute types and attribute values as a tree structure based on a structure of an object class, comprising the steps of: (aa) generating a view definition in which a view definition identifier is attached to a directory manipulation syntax which contains at least a directory manipulation word specifying one or a plurality of set operations, and class and attribute of the substantial directories as a manipulation object; (bb) storing a generated view definition in a view definition set; (cc) inputting a view search instruction for manipulating data, which is defined by a combination of arbitrary class and attribute requested by an application; (dd) specifying a directory manipulation syntax having the view definition identifier described in the view search instruction from the view definition set, and translating the view search instruction into a directory manipulation instruction which acquires collectively attribute values of entry sets requested by the view search instruction by manipulating one or a plurality of substantial directories; (ee) translating the directory manipulation into an entry unit manipulation instruction for manipulating the substantial directories in entry unit; (ff) extracting entries from the substantial directories using the entry unit manipulation instruction to derive an entry set as a batch directory manipulation result and generating a directory set operation instruction including the entry set and a set operation defined by the view definition; and (gg) generating a customized directory corresponding to the view search instruction of the application according to a combination of the class and the attribute as a result of the set operation by executing the directory set operation instruction.

According to still another aspect of the present invention, there is provided an apparatus for accessing a substantial directory for sorting and managing data, comprising: (a) a unit for inputting a view search instruction for manipulating data, which is defined by a combination of arbitrary class and attribute requested by an application; (b) a unit for translating the view search instruction into a directory manipulation instruction for manipulating one or a plurality of substantial directories according to a prescribed view definition; (c) a unit for extracting entries from the substantial directories using the directory manipulation instruction to derive an entry set; and (d) a unit for generating a customized directory corresponding to the view search instruction of the application according to a combination of the class and the attribute as a result of a set operation, by applying the set operation defined in the view definition to the entry set.

According to still another aspect of the present invention, there is provided an system for accessing a substantial directory for sorting and managing data which joins entries which stores sets of attribute types and attribute values as a tree structure based on a structure of an object class, comprising: (aa) a unit for generating a view definition in which a view definition identifier is attached to a directory manipulation syntax which contains at least a directory manipulation word specifying one or a plurality of set operations, and class and attribute of the substantial directories as a manipulation object; (bb) a unit for storing a generated view definition in a view definition set; (cc) a unit for inputting a view search instruction for manipulating data, which is defined by a combination of any class and attribute requested by an application; (dd) a unit for specifying a directory manipulation syntax having the view definition identifier described in the view search instruction from the view definition set and translating the view search instruction into a directory manipulation instruction which acquires collectively attribute values of entry sets requested by the view search instruction, by manipulating one or a plurality of substantial directories; (ee) a unit for translating the directory manipulation instruction into an entry unit manipulation instruction for manipulating the substantial directories in entry unit; (ff) a unit for extracting entries from the substantial directories using the entry unit manipulation instruction to derive an entry set as a batch directory manipulation result and generating a directory set operation instruction including the entry set and a set operation defined by the view definition; and (gg) a unit for generating a customized directory corresponding to the view search instruction of the application according to a combination of the class and the attribute as a result of the set operation by executing the directory set operation instruction.

According to still another aspect of the present invention, there is provided a computer-readable recording medium for causing a computer to execute a processing for accessing a substantial directory for sorting and managing data, the processing including: (a) a process for inputting a view search instruction for manipulating data, which is defined by a combination of any class and attribute requested by an application; (b) a process for translating the view search instruction into a directory manipulation instruction for manipulating one or a plurality of substantial directories according to a prescribed view definition; (c) a process for extracting entries from the substantial directories using the directory manipulation instruction to derive an entry set; and (d) a process for generating a customized directory corresponding to the view search instruction of the application according to a combination of the class and the attribute as a result of a set operation, by applying the set operation defined in the view definition to the entry set.

According to still another aspect of the present invention, there is provided a computer-readable recording medium for causing a computer to execute a processing for accessing a substantial directory for sorting and managing data which joins entries which stores sets of attribute types and attribute values as a tree structure based on a structure of an object class, the processing including: (aa) a process for generating a view definition in which a view definition identifier is attached to a directory manipulation syntax which contains at least a directory manipulation word specifying one or a plurality of set operations, and class and attribute of the substantial directories as a manipulation object; (bb) a process for storing a generated view definition in a view definition set; (cc) a process for inputting a view search instruction for manipulating data, which is defined by a combination of arbitrary class and attribute requested by an application; (dd) a process for specifying a directory manipulation syntax having the view definition identifier described in the view search instruction from the view definition set and translating the view search instruction into a directory manipulation instruction which acquires collectively attribute values of entry sets requested by the view search instruction, by manipulating one or a plurality of substantial directories; (ee) a process for translating the directory manipulation instruction into an entry unit manipulation instruction for manipulating the substantial directories in entry unit; (ff) a process for extracting entries from the substantial directories using the entry unit manipulation instruction to derive an entry set as a batch directory manipulation result and generating a directory set operation instruction including the entry set and a set operation defined by the view definition; and (gg) a process for generating a customized directory corresponding to the view search instruction of the application according to a combination of the class and the attribute as a result of the set operation by executing the directory set operation instruction.

Other features and advantages of the present invention will become apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a view showing a relationship between a group of content directories and a view directory;

FIG. 9 is a view showing an example of a view definition when a manipulation object is one content directory;

FIG. 10 is a view showing an example of a view definition when the manipulation object is two content directories;

FIGS. 12A and 12B are views showing examples of entry attributes of a company class and a staff class belonging to the "business division" in the company directory in FIG. 11 respectively;

FIG. 15 is a view showing a directory search instruction corresponding to the search scopes in FIG. 14;

FIG. 18 is a view showing an example of a view definition syntax employed to obtain the view directory in FIG. 17;

FIGS. 19A and 19B are views showing a view search instruction and a base entry and a search scope in the view search instruction respectively;

FIGS. 20A and 20B are views showing the search scopes of a directory manipulation instruction 1 and a directory manipulation instruction 2 respectively;

FIGS. 25A and 25B are views showing an example of the view directory derived by a projection operation without top sections from the company directory in FIG. 11 respectively;

FIGS. 26A to 26D are views showing an example of the view directory derived by a selection operation from the company directory in FIG. 11 respectively;

FIGS. 27A and 27B are views showing an example of the view directory derived by other selection operation from the company directory in FIG. 11 respectively;

FIGS. 28A to 28E are views showing an example of the view directory derived by a join operation from the company directory in FIG. 11 respectively;

FIGS. 29A to 29B are views showing an example of the view directory derived by an aggregation set operation from the company directory in FIG. 11 respectively.

DETAILED DESCRIPTION OF THE PREFERRED EMBODIMENTS

Figure 1:
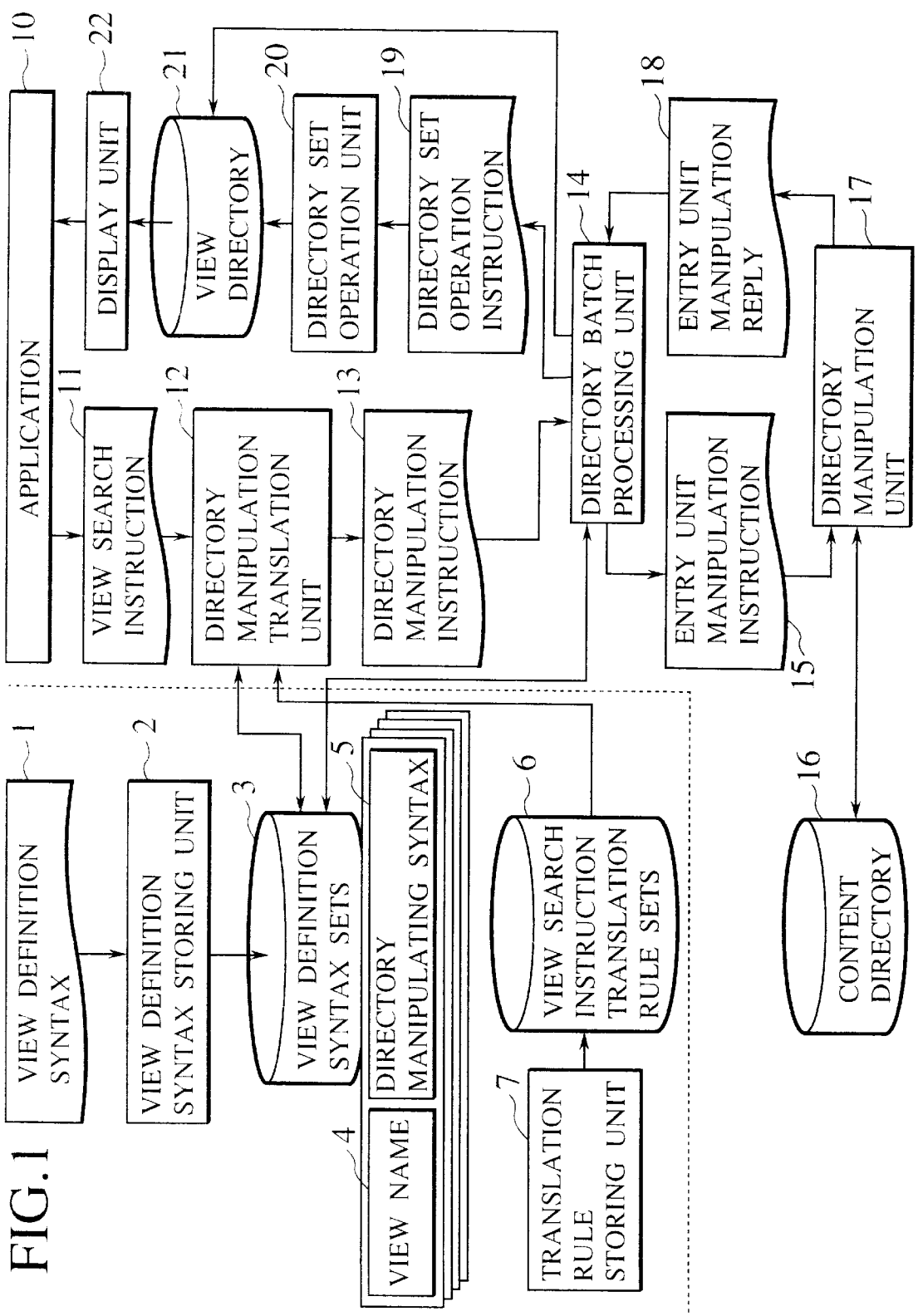
FIG. 1 is a block diagram showing a configuration of a directory access apparatus according to an embodiment of the present invention.

Here, embodiment of a scheme for accessing data management directory according to the present invention will be explained in detail with reference to the accompanying drawings.

First, the principle of the scheme for accessing data management directory according to the present invention will be explained hereunder. In the scheme for accessing directory according to the present invention, since a plurality of applications can share the information on the substantial directories and a virtual directory structure which is customized to be easily utilized by individual applications can be provided, it is possible to manage the objects in which the information on the available substantial directories are selected in class unit, entry unit, or attribute unit as the view definition syntax (definition information) and to manipulate the substantial directories by using the view definition syntax. In this view definition syntax, views peculiar to individual applications are defined for substantial directories for sorting and managing actual data (referred to as "content directories" hereinafter).

These view definition syntaxes are defined for the content directories as various set operations using the relational algebra. Respective applications can derive the view directories as the virtual directories, which are customized to fit for the purpose of application, by carrying out the directory manipulation with the use of the view definition syntaxes. This view directory is a virtual directory which cuts out a part of the content directories, or integrates a plurality of directories, and shows the directory information through the integrated interface.

In the scheme for accessing directory according to the present invention, since the above view directory has following features, the content directories can be constructed independently from the applications and makes it easy for the applications to share these content directories.

(1) It is possible to customize the directory structure.

In the conventional art, the directory structure which is accessed by the application is fixed. Then, upon manipulating the fixed directory structure, when the particular classes, the particular entries, or the particular attributes on the directory is selected as the object to be processed, for example, cutting-out of the directory must be prepared every application.

In contrast, in the scheme for accessing directory according to the present invention, a function for customizing arbitrary the content directory structure can be provided. For example, a function for cutting out only the data corresponding to the particular class, entry, or attribute, a function for aggregating the directory hierarchies of the content directory by reducing them in accordance with the use of the application (e.g., reducing three hierarchies to two hierarchies, etc.), etc. can be provided.

(2) It is possible to search related information between a plurality of directories.

In the conventional art, when the related information between classes, entries, or attributes on the content directories are searched at the same time, this related information must be prepared individually every application.

On the contrary, in the scheme for accessing directory according to the present invention, for example, a function for integrating two content directories by using the related information (key information) and then searching entries of the directories can be provided.

(3) It is possible to protect the security user by user.

There are a variety of information managed by the content directories from the information which all applications can refer to the information which only the system administrator can refer to. In the scheme for accessing directory according to the present invention, a security protecting function for limiting the access scope of the directory relative to the applications in view unit, for example, can be provided.

Note that the content directory which can be accomplished by the scheme for accessing directory according to the present invention is a directory system in which LDAP (Light Weight Directory Access Protocol: Tim Howes, Ph.D Mark Smith "LDAP Programming Directory-Enabled Applications with Light Weight Directory Access Protocol", (1997)) which is a simplified X.500 directory model is incorporated, for example.

Next, the scheme for accessing directory according to the present invention will be explained in detail with reference to FIG. 1 to FIG. 30. According to this embodiment, a function for deriving the view directory in which the information on a group of intended content directories are customized with respect to viewpoints of the applications can be provided. According to this view directory, the applications can derive only the desired directory structure from one or a plurality of content directories independently from content directories (i.e., substantial directories).

The apparatus for accessing directory according to the present invention extracts the view directory acting as the virtual directory which is easy for individual applications to utilize, from the content directories for managing the location of various data and the access information.

Here, the content directory is the data model which manages the information by binding the entries (data), which store the attribute sets, via the tree structure according to the structure of the object class. One information contained in the object class is called the attribute. This attribute consists of the attribute type indicating what type of information the attribute belongs to, and the attribute value indicating the concrete information contents (values) in the attribute type. The entry means respective instances on the object class.

While, the view directory is a collection of partial information of a group of content directories, which can be derived from the results of various set operations with respect to content directories using the relational algebra as a base. This set operations contain an union operation, a difference operation, an intersection set operation, a Cartesian product operation, a projection operation, a selection operation, the join operation, and an aggregation operation, and their details will be explained in detail.

The directory access apparatus according to the present invention can be applied to the view directory process in which the content directories which manage the location of the sight-seeing guidance data, for example, and the access information are constructed independently from the applications, and which can provide the view directories serving as the virtual directories which can be easily utilized by individual applications from the actual directories (content directory group) which are used commonly by a plurality of applications based on various viewpoints of individual users (using applications).

FIG. 1 is a block diagram showing a configuration of a directory access apparatus according to an embodiment of the present invention. This directory access apparatus according to the present embodiment comprises a view definition syntax sets 3 which is the set of the syntax to define a view name 4 for a directory manipulating syntax 5 in order to manipulate the content directories; a view definition syntax storing unit 2 for storing a view definition syntax 1 into the view definition syntax sets 3; view search instruction translation rule sets 6 which are the sets of rules employed to translate a view search instruction 11 into a directory manipulation instruction 13; a translation rule storing unit 7 for storing the view search instruction translation rules in the view search instruction translation rule sets 6; a directory manipulation translation unit 12 for translating the view search instruction 11, which serves as the directory manipulation instruction for the view directory, into the directory manipulation instruction 13 which is the manipulation instruction for a content directory 16; a directory batch processing unit 14 for generating an entry unit manipulation instruction 15, which is the manipulation instruction of the attribute value in entry unit of the content directory, from an inputted directory manipulation instruction 13 and then acquiring the result of the batch directory manipulation based on the manipulation reply obtained by the entry unit manipulation instruction 15 in entry unit; a directory manipulation unit 17 for obtaining an entry unit manipulation reply 18 by accessing the content directory 16 according to the entry unit manipulation instruction 15; and a directory set operating unit 20 for deriving a view directory 21 from the operation result by applying the set operation to the entry sets which are the set operation object derived from the content directory 16 every operation type, based on a directory set operation instruction 19 being outputted from the directory batch processing unit 14. The directory access apparatus according to this embodiment may further comprise a display unit 22 for displaying the derived view directory 21 as the hierarchical tree structure, or the like to the user on the inside or the outside of the application 6.

The view definition syntax storing unit 2 stores the view definition syntax 1, which defines views of applications for the content directory 16, into the view definition syntax sets 3.

The directory manipulating syntax 5 described in the view definition syntax comprises a directory manipulation word which is a syntax for manipulating the directory, a class name, and its attribute.

The translation rule storing unit 7 stores the translation rules, which are employed to translate the view definition syntax corresponding to the view search instruction 11 into the directory manipulation instruction 13, in the view search instruction translation rule sets 6 every type of the set operation.

The directory manipulation translation unit 12 specifies the directory manipulating syntax 5, which corresponds to the view name designated by the view search instruction 11, in the view definition syntax sets 3, then decides the set of the entry and its attribute which are the manipulation object to manipulate the information on the content directory 16 based on the specified directory manipulating syntax 5, and then translates the view search instruction 11 inputted from the application 6 into the directory manipulation instruction 13, which is the manipulation to acquire attribute values of the entry sets collectively, based on the view search instruction translation rule sets 6.

The directory batch processing unit 14 receives the directory manipulation instruction 13 which are the batch (i.e., collective) manipulation instruction of the set of the entry and its attribute, generates the entry unit manipulation instruction 15 which manipulates the attribute value of the information on the content directory in entry unit, and then outputs it to the directory manipulation processing portion 17. Also, the directory batch processing unit 14 generates the batch result of the directory manipulation by integrating the entry unit manipulation reply 18 outputted from the directory manipulation unit 17, then translates this result of the batch directory manipulation into the directory set operation instruction 19 based on the set operation which is defined by the corresponding directory manipulating syntax 5 in the view definition syntax sets 3, and then output it.

The directory manipulation unit 17 receives the entry unit manipulation instruction 15, then manipulates the content directory 16 using this entry unit manipulation instruction 15, and then returns the result derived by this manipulation as the entry unit manipulation reply to the directory batch processing unit 14 as the directory manipulation instruction source.

The directory set operating unit 20 applies the set operation to the entry set serving as the set operation object, which is acquired from the content directory 16, every operation type based on the directory set operation instruction 19, and then generates the result of this set operation as the view directory 21. When the operation types are the projection operation, the selection operation, the join operation, the aggregation operation, etc. described later, the directory set operating unit 20 may be composed in the directory batch processing unit 14, and may construct the result of the directory manipulation by integrating the entry unit manipulation reply 18 without using the directory set operation instruction 19 as the hierarchical tree structure so as to generate the view directory 21.

The display unit 22 displays the generated view directory 21 as the hierarchical tree structure to the user.

Next, details of the deriving process of the view directory 21 in the directory access apparatus according to this embodiment will be explained.

The directory access apparatus according to the first embodiment provides the directory structure, in which a plurality of applications share a group of content directories and individual applications are easy to utilize, as the view directory 21.

First, this embodiment provides a function for deriving a new directory tree by cutting out the information on the content directory 16 in units of class, entry and attribute, as a function for manipulating the content directory to provide the view directory 21. In order to implement this cutting-out function, the union operation, the difference operation, the intersection operation, the Cartesian product operation, the projection operation, and the selection operation can be defined in the directory manipulating syntax 5 in the view definition syntax sets 3 as the set operation for the content directory 16.

The union operation is an operation for cutting out all entries contained in each one of two entry sets in one class on one or a plurality of content directories 16. At this time, the directories are derived such that the entries having identical class and their attribute are not contained therein.

The difference operation is an operation for cutting out the entry sets, which belong to one entry set but not belong to the other entry set, in two entry sets in one class on one or plural content directories 16.

The intersection operation is an operation for cutting out the entry sets which are contained in both two entry sets in one class on one or plural content directories 16.

The Cartesian product set operation is an operation for multiplying all attributes contained in two entries respectively, which are derived as all combination of the entry set contained in two classes on the content directory respectively, to produce the entry sets, and then cutting out the entry sets in a new class having such all attributes.

The projection operation is an operation for cutting out only the sets, which have the particular attributes in the entry, from all entry sets in one class on the content directory 16.

The selection operation is an operation for cutting out the entry sets, which are selected according to the attribute values, from all entry sets in one class on the content directory 16.

Second, this embodiment provides a function for deriving a new directory tree by binding the information having related contents on the content directory 16 between the classes, the entries and the attributes, as a function for manipulating the content directory to provide the view directory 21. In order to implement this binding function, the join operation and the aggregation operation can be defined in the directory manipulating syntax 5 in the view definition syntax sets 3 as the set operation for the content directory 16.

The join operation is an operation for cutting out the entries in the other class, which satisfy the condition specified by the attributes of the particular entries on one class, from all entry sets in two classes on the content directory 16.

The aggregation operation is an operation for cutting out the particular entry set which is bound directly below one entry in one class on the content directory 16, and then binding this entry set below one entry in the other class.

Figure 2:
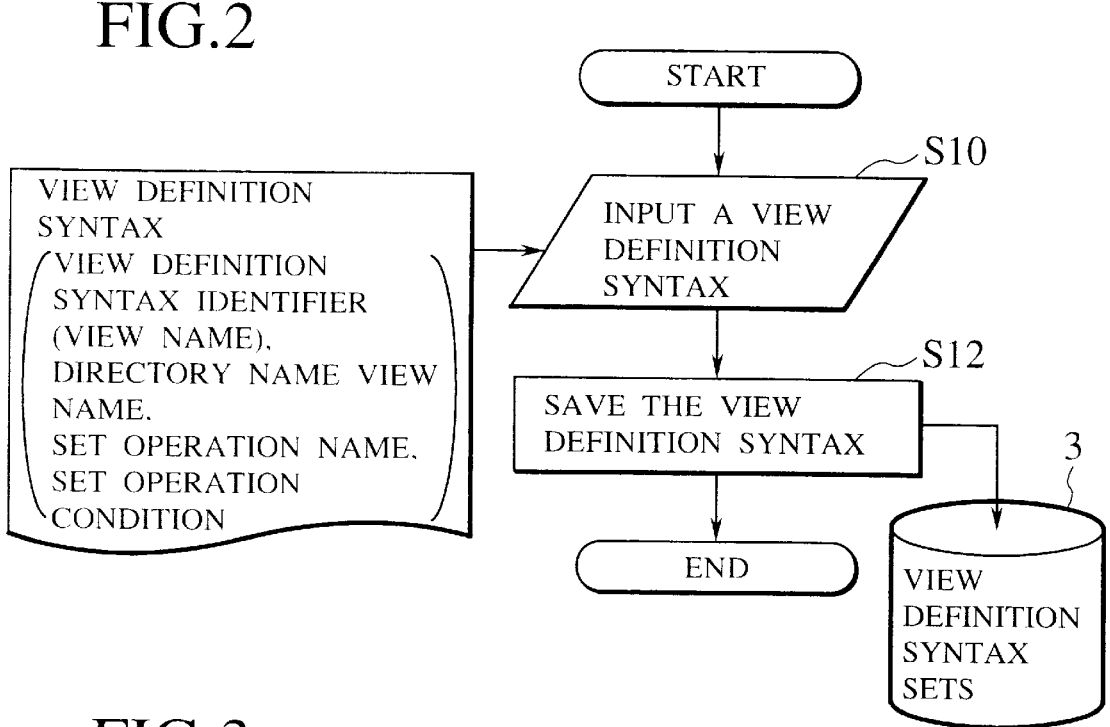
FIG. 2 is a flowchart showing process procedures in a view definition syntax storing process carried out by a view definition syntax storing unit according to an embodiment of the present invention.

FIG. 2 is a flowchart showing a view definition syntax generating process which is carried out first as a preliminary preparation for the directory access apparatus according to this embodiment.

First, the view definition syntax 1 is inputted into the view definition syntax storing unit 2 (step S10). This view definition syntax 1 comprises a view definition syntax identifier (view name), a directory name as the operation object, a set operation name, and set operation conditions. The set operation name and the set operation conditions are described in the directory manipulating syntax 5 comprising the directory manipulation word, the class name, and the attribute. Each application considers the view to be utilized in correspondence with the substantial content directory structure which manages the data to be accessed, and defines the view definition syntax 1. The view definition syntax 1 is stored in the view definition syntax sets 3 (step S12).

Figure 3:
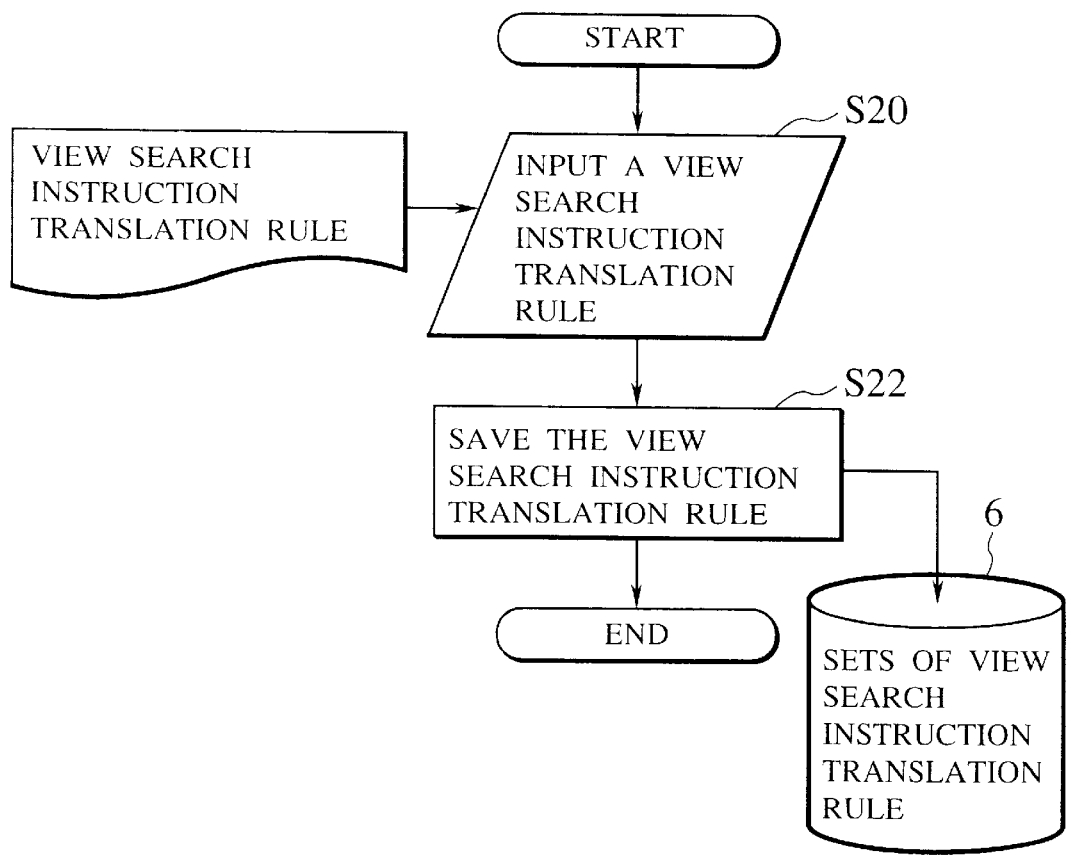
FIG. 3 is a flowchart showing process procedures in a view search instruction translation rule storing process carried out by a translation rule storing unit according to an embodiment of the present invention.

FIG. 3 is a flowchart showing a view search instruction translation rule generating process which is carried out second as a preliminary preparation for the directory access apparatus according to this embodiment. The view search instruction translation rules are described as a rule in the form of "if then" in which a set operation name, an operation condition, both of which is described in the view definition syntax, and a search condition in the view search instruction are used as arguments. First, this view search instruction translation rule is inputted into the translation rule storing unit 7 (step S20). The inputted view search instruction translation rule is saved in the view search translation rule sets 6 (step S22).

The following formula (1) shows a generalized format of this view search instruction translation rule.

```
If [operation name (union, select etc.)]

if [search scope of view search instruction (base, onelevel, subtree)]

if [search base entry of view search instruction is upper than operation base entry] then /* more than one directory manipulation instruction */ search( dir=[directory name described in view definition syntax]

base=[search base entry of view search instruction]

scope=[search scope prepared for each view search instruction and operation type]

filter=[set according to operation type and view search instruction]

attrs=[set according to operation type and view search instruction]

return

)

else if [search base entry of view search instruction is identical entry to operation base entry]

/* one more directory manipulation instruction */

. . .

else if [search base entry of view search instruction is lower than operation base entry]

/* one more directory manipulation instruction */

. . .

end if

. . .
```
```
    end if

. . .

end if                                                     (1)
```

As shown in above formula (1), the directory manipulation instructions to be generated should be described in the view search instruction translation rule for every set operation type and every view search instruction.

The directory manipulation instruction should be prepared separately corresponding to whether a search base entry of view search instruction is a upper level, identical level, or lower level with respect to a operation base entry prepared for every operation type. Attribute information of the entry can be shown as a part of view directory even if the entry doesn't exist actually by preliminarily defining the entry in the view definition syntax and referring to it.

Figure 4:
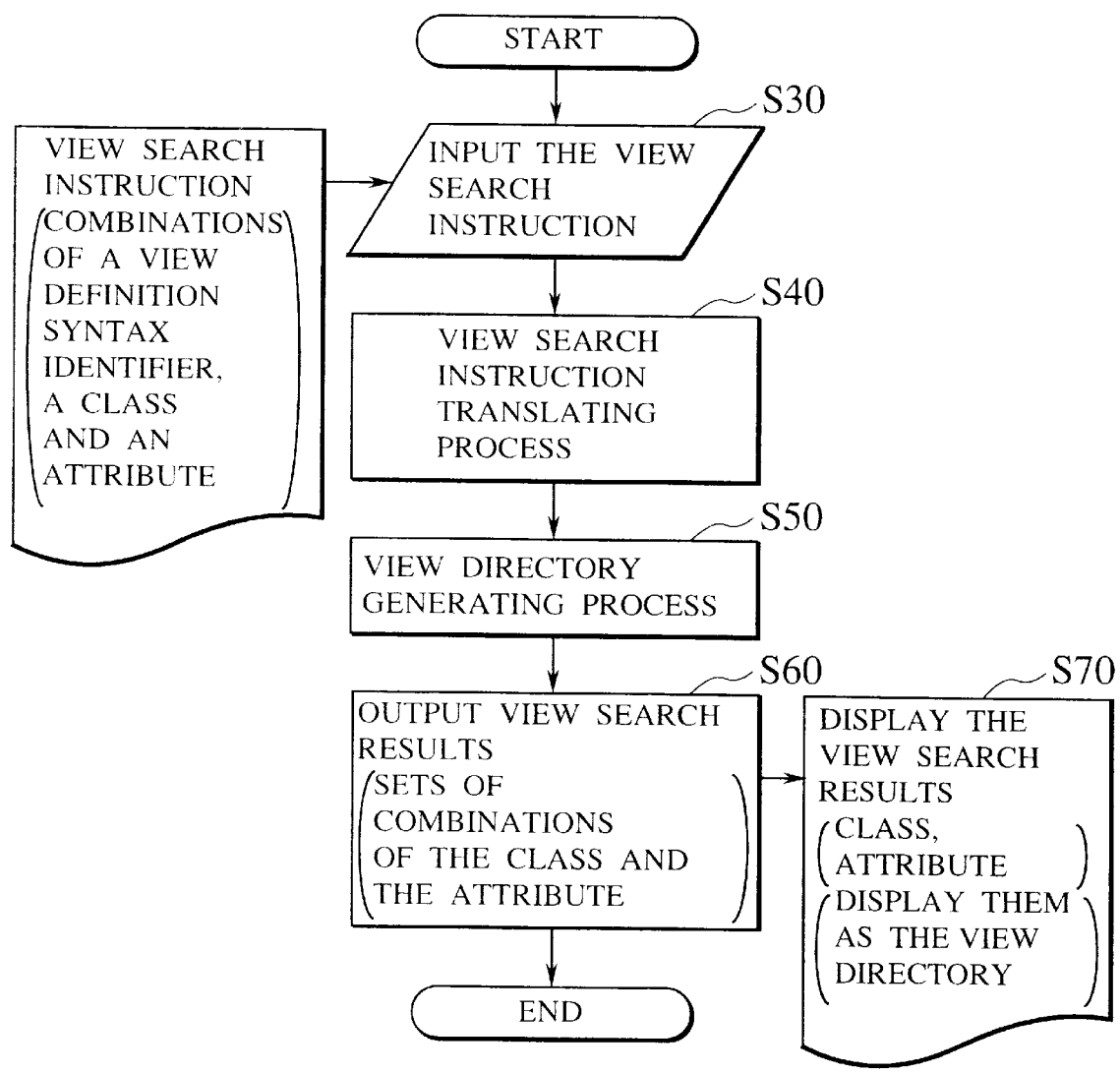
FIG. 4 is a flowchart showing schematic process procedures in a view directory generating process according to an embodiment of the present invention.

FIG. 4 is a flowchart showing an outline of a process for generating the view directory 21 carried out by the directory access apparatus according to this embodiment by accessing the content directory 16. First, the view search instruction 11 is inputted from the application 10 (step S30). This view search instruction 11 comprises sets of the view definition syntax identifier (view name), the class, and the attribute. The directory manipulation translation unit 12 carries out a view search instruction translating process for generating the directory manipulation instruction 13 to access the content directory 16 from the view search instruction 11 (step S40). The directory batch processing unit 14, the directory manipulation unit 17, and the directory set operation unit 20 manipulate the content directory 16 by using the directory manipulation instruction 13, and then apply the set operation defined in the view definition syntax to the manipulation results to output the view search results (step S50). Detailed processes in steps S40 and S50 will be described later. The sets of combinations of the class and the attribute as the view search results are output to the application 10 as the view directory 21 (step S60). The display unit 22 displays the view search results (class, attribute) as the view directory 21 (step S70).

Figure 5:
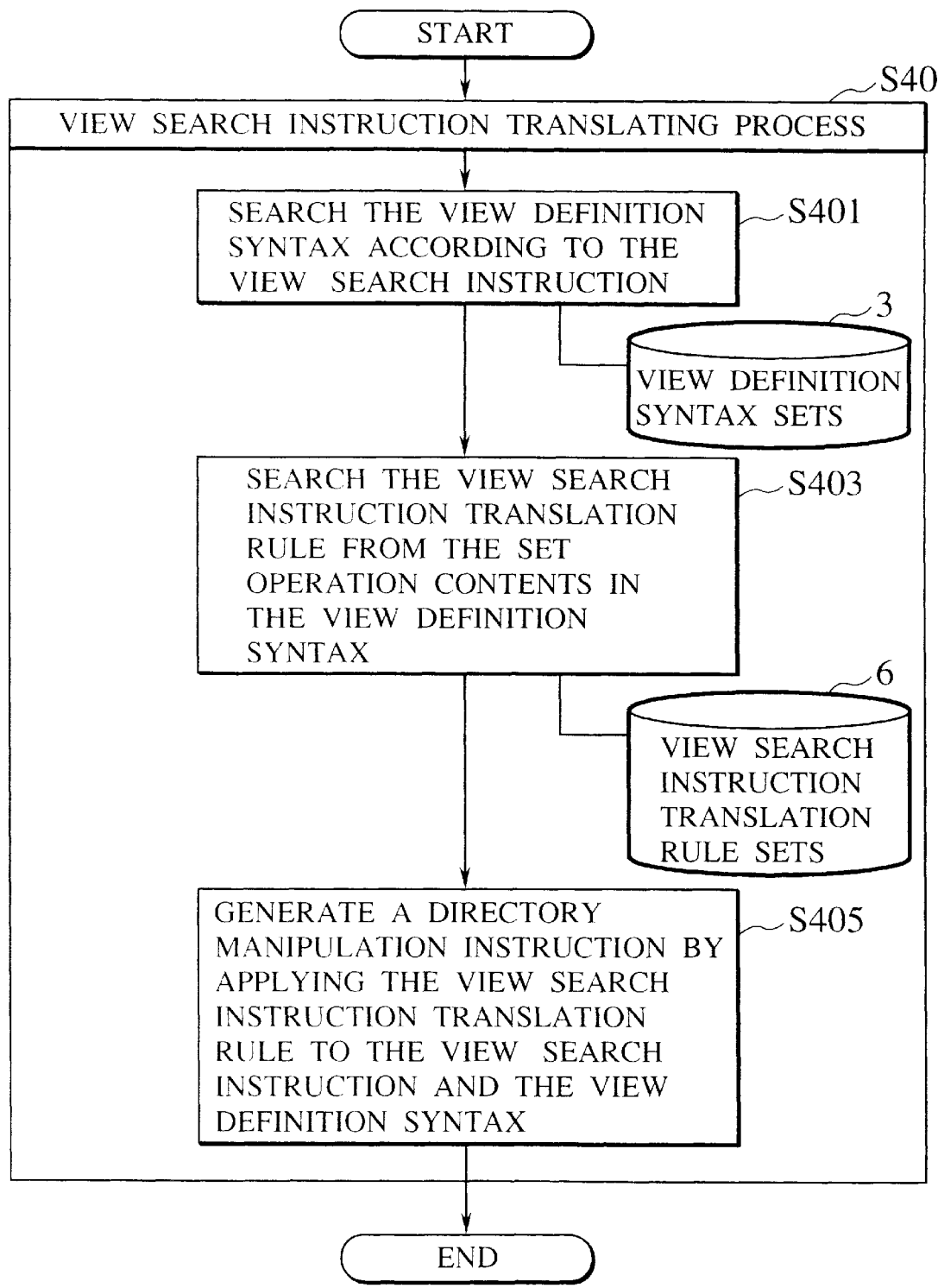
FIG. 5 is a flowchart showing detailed process procedures in a view search instruction translating process in step S40 in FIG. 4.

FIG. 5 is a flowchart showing details of the view search instruction translating process in step S40 in FIG. 4.

First, the directory manipulation translation unit 12 searches the view definition syntax sets 3 using the view definition syntax identifier (view name) in the inputted view search instruction 11 as a key to detect the view definition syntax (step S401). Based on the set operation contents (set operation name and set operation conditions) defined in the view definition syntax with this view name, the directory manipulation translation unit 12 further searches the view search instruction translation rule sets 6 (step S403). Then, the directory manipulation instruction 13 is generated by applying the detected view search instruction translation rule to the view search instruction and the view definition syntax (step S405).

Figure 6:
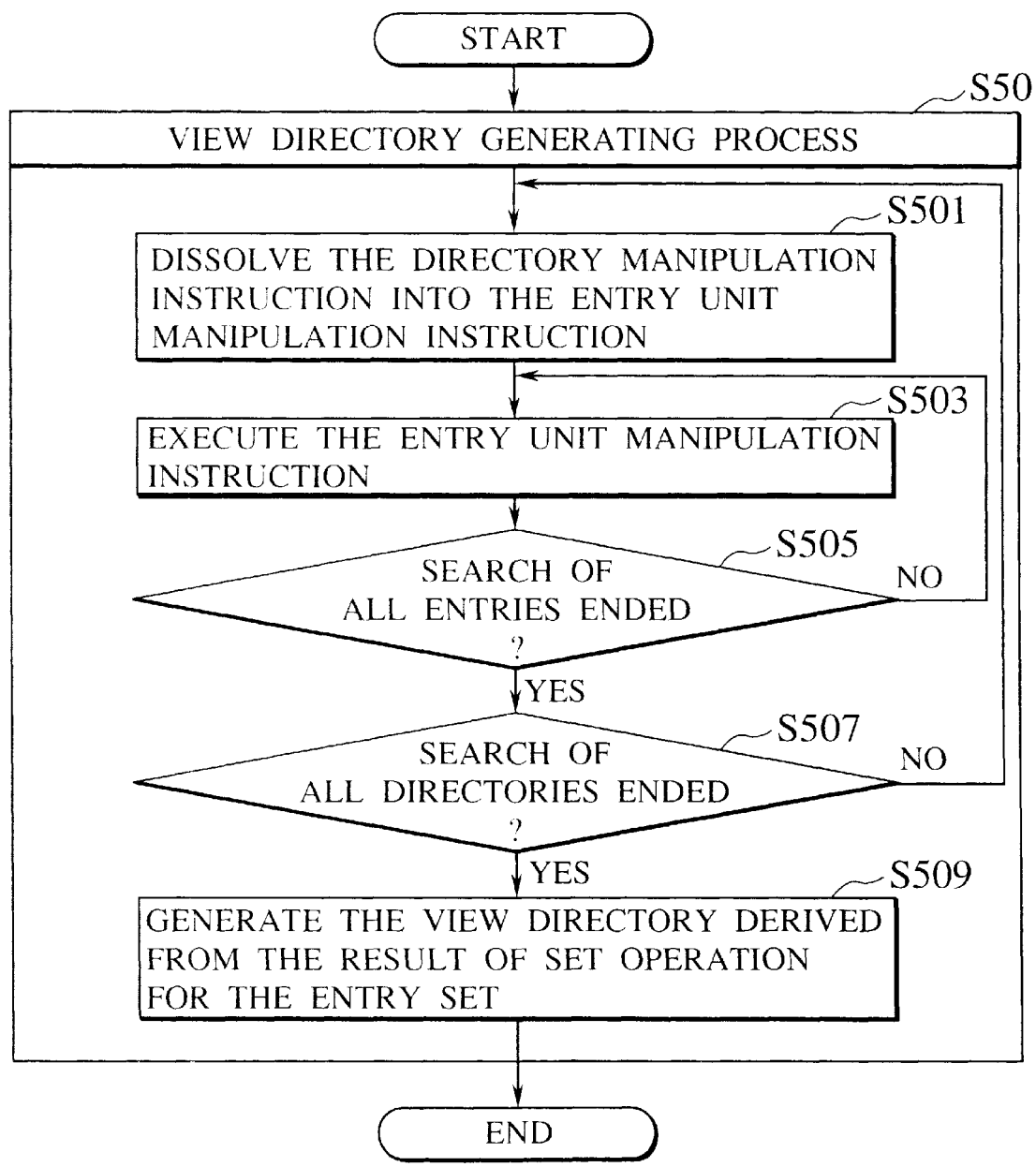
FIG. 6 is a flowchart showing detailed process procedures in a view directory generating process in step S50 in FIG. 4.

FIG. 6 is a flowchart showing details of the view directory generating process in step S50 in FIG. 4.

First, the directory batch processing unit 14 dissolves the inputted directory manipulation instruction 13 into the entry unit manipulation instructions 15 (step S501). The directory manipulation unit 17 manipulates the content directory 16 by using the entry unit manipulation instructions 15 obtained by dissolution to search in entry unit, and then generates the entry unit manipulation reply 18 (step S503). This entry unit search is repeated until the searches of all entries in the content directory as the current process object are ended (if NO in step S505). If the searches of all entries in the content directory are ended (if YES in step S505), the process goes to step S507. Then, until the searches of all directories are ended (if NO in step S507), the process returns to step S501 to repeat the search process. If the searches of all content directories are ended (if YES in step S507), the directory set operation instruction 19 is generated. The directory set operation unit 20 applies the set operation to the derived entry set based on the directory set operation instruction 19, and then generates the result of set operation for the entry set corresponding to the inputted view search instruction 11 as the view directory 21 (step S509). The directory set operation instruction 19 contains the entry set serving as the set operation object, the set operation name, and the set operation condition.

Figure 7:
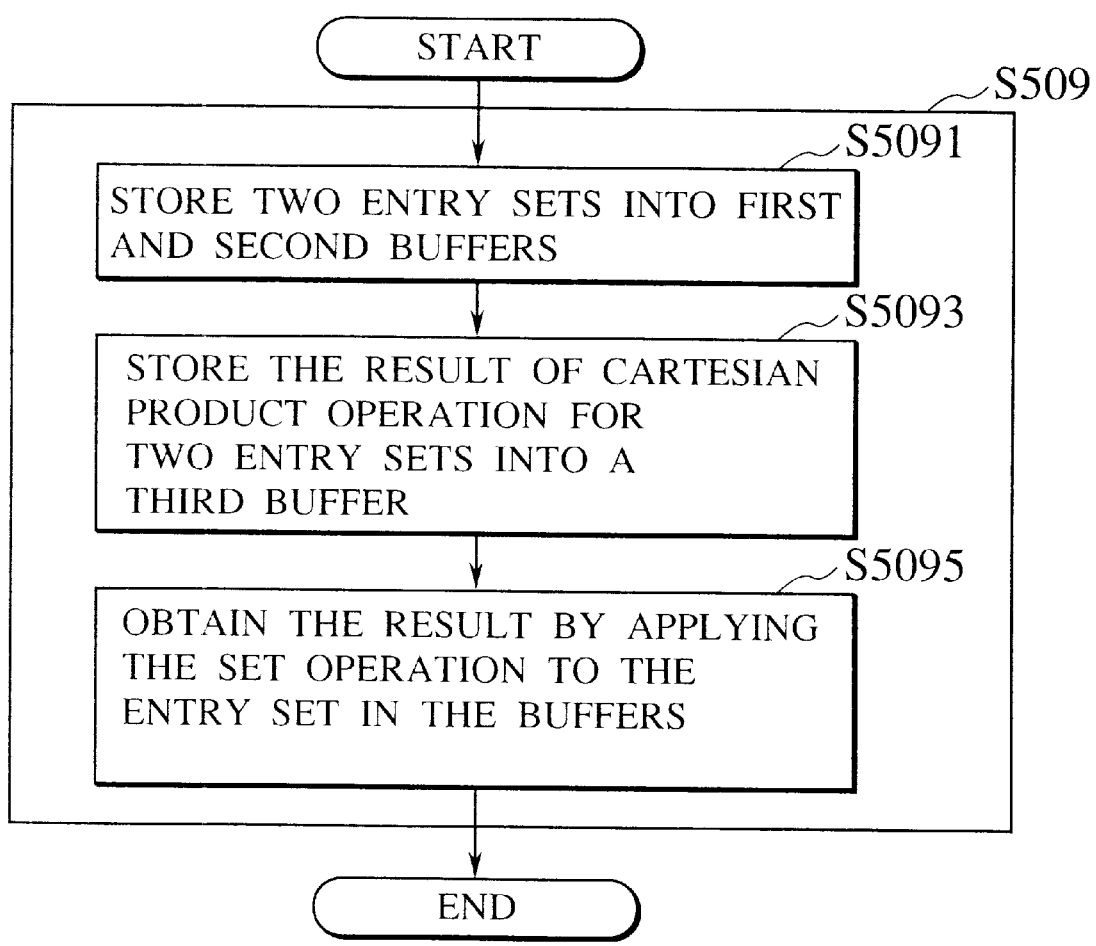
FIG. 7 is a flowchart showing detailed process procedures in a set operation process in step S509 in FIG. 6.

FIG. 7 is a flowchart showing details of the set operation process in step S509 in FIG. 6.

First, the directory set operation unit 20 stores two entry sets into two buffers which are prepared as a table format having attribute series contained in one entry as one row (step S5091). The result of Cartesian product operation in which the contents of two table format buffers are multiplied in unit of row are stored into another table format buffer (step S5093). The set operation results are obtained by carrying out the set operation according to the operation type by using the entry sets stored in the above buffers (step S5095).

As described above, the set operation unit 20 carries out the set operation, and sort and reconfigure a directory tree. However, if the set operation to be carried out is one of projection operation, selection operation, join operation and aggregation operation, then the directory batch processing unit 14 may extract entry corresponding to the condition for attribute defined in the view definition syntax, and the set operation unit 20 may sort the directory tree such that only extracted entries serving as nodes form the directory tree.

FIG. 8 is a view showing a relationship between a group of content directories 16 and the view directory 21 in this embodiment. The view directory 21 which can be easily utilized by the application is generated from a group of content directories 16 based on the combination of the set operation.

FIG. 9 shows an example of the view definition when one content directory 16 is selected as the manipulation object. FIG. 10 shows an example of the view definition when two content directories are selected ass the manipulation object.

Figure 11:
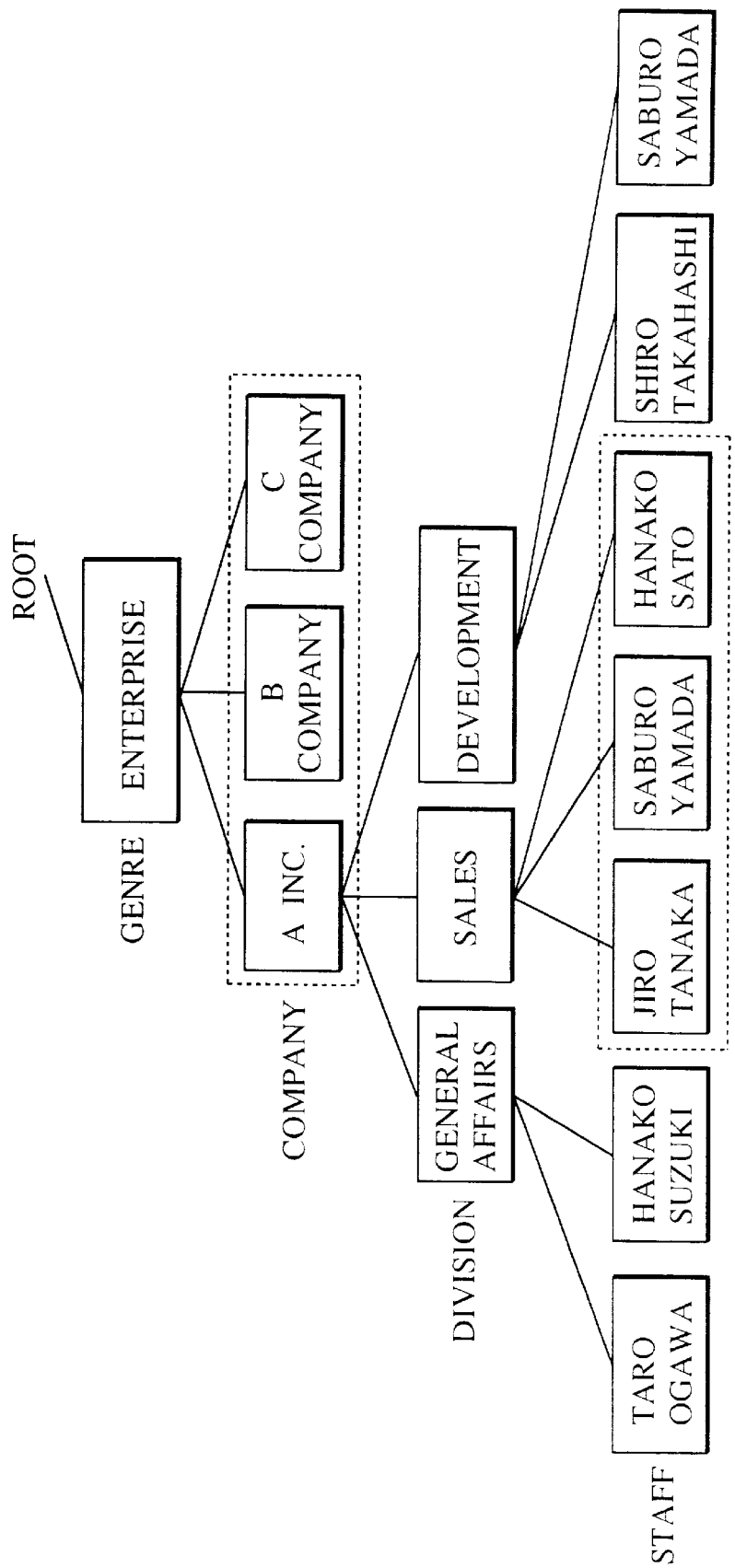
FIG. 11 is a view showing an example of a company directory for sorting and managing data of a company.

Next, while taking the case where a company directory shown in FIG. 11 is used as the content directory 16 as an example, the view directory generating processes which corresponds to various set operations in the directory access apparatus according to this embodiment will be explained in detail.

First, the case where the view directory 21 is formed by the union operation for cutting out the information from the company directory shown in FIG. 11 in entry unit will be explained with reference to FIG. 11 to FIG. 20.

FIG. 12A shows entry attributes (attribute type and attribute value) of a company class in the company directory in FIG. 11. FIG. 12B shows entry attributes (attribute type and attribute value) of the staff, whose division is the sales division, out of a staff class in the company directory in FIG. 11.

Figure 13:
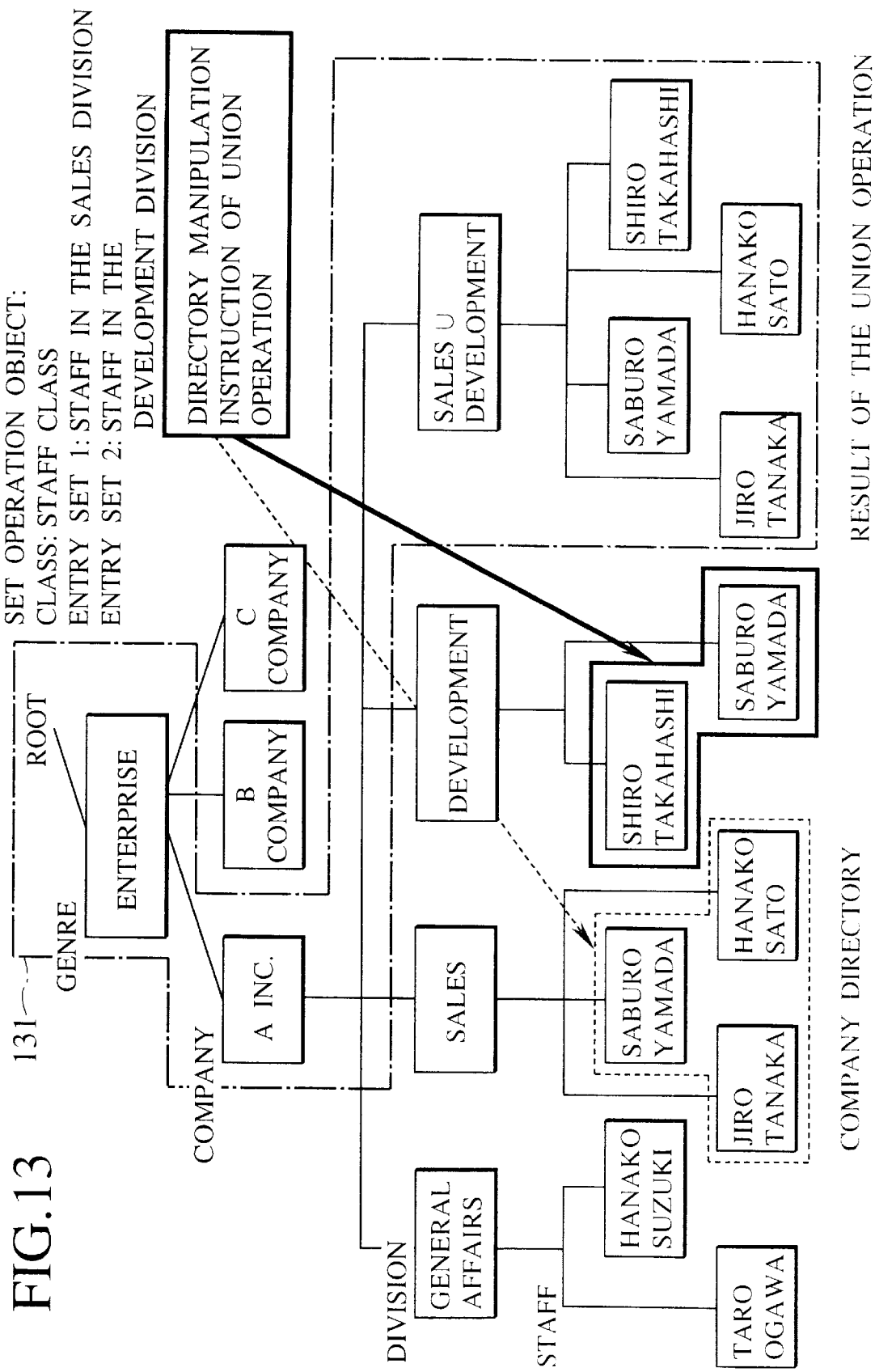
FIG. 13 is a view showing an example of a view directory extracted from the company directory in FIG. 11 by an union operation.

FIG. 13 shows an example of the view directory 131 generated from the company directory in FIG. 11 by the view defining syntax concerning the union operation. The entry set which is the union of the entry set 1 of the "sales division" and the entry set 2 of the "development division" in the staff class is cut out from the company directory in FIG. 11, and then is bound directly below the union operation entry. In this case, entries in which the relative identification names and the attribute values are overlapped mutually are not contained in this union operation entry set. "Saburo Yamada" in the staff entry in FIG. 11 belongs to two divisions of the sales division and the development division, but he is never cut out overlappingly as the result of the union operation.

Then, procedures of the process generating the view directory 131 in FIG. 13 will be explained.

In the search manipulation as one main manipulation of the directory manipulations, normally the manipulation is decided according to the directory manipulation syntax given by following formula (1-1), by using the directory manipulation word indicating the search given as "Search" and the argument corresponding to the manipulation word.

Search (base entry name, search scope, search condition, attribute name, return value)     (1-1)

Figure 14:
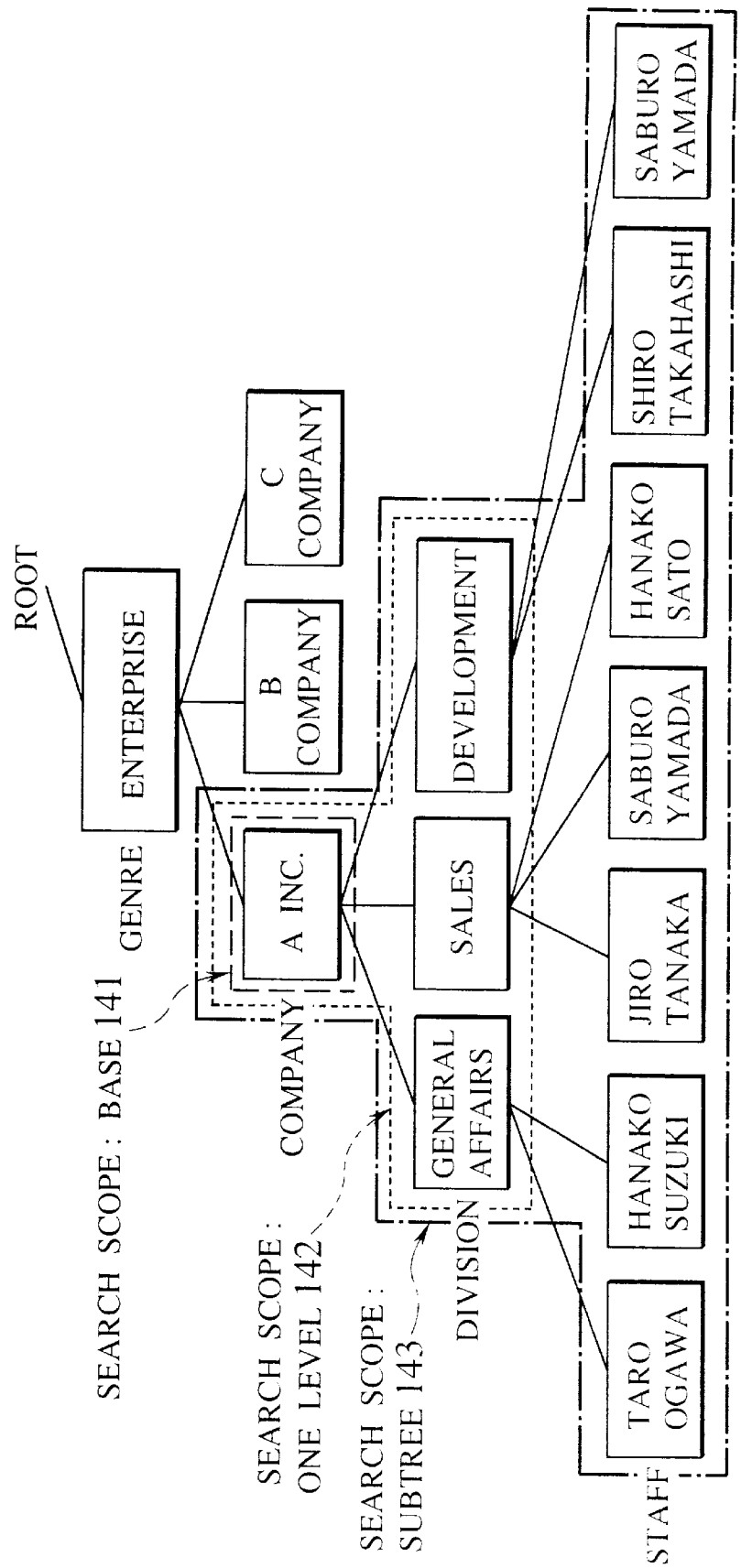
FIG. 14 is a view showing a search scope in the company directory in FIG. 11.

In this formula (1-1), the entry identification name which can identify uniquely the entry serving as a base of the search scope on the directory is decided as the base entry name. As the search scope, only the base entry (base) as shown by 141 in FIG. 14, or all entries directly below the base entry by one hierarchy (one level) as shown by 142 in FIG. 14, or a tree whose root is the base entry (subtree) as shown by 143 in FIG. 14 is selected. As the search condition, the conditions for the information acquired from the search scope is decided. More particularly, the conditions associated with the object class, the entry name, the entry attribute value are decided. As the attribute name, attribute names requested by respective entries are decided. As the result of the directory manipulation, the pointer of the structure which stores the information to meet the condition is returned to the return value.

For example, when all staffs in A Inc. are searched from the company directory in FIG. 11, the directory manipulation syntax 5 given by following formula (1-2) is specified.

Search (base entry name=A Inc., search scope=subtree, search condition=all company staff classes, attribute name=general name, return value 1)     (1-2)

A list of the general names of all staffs in A Inc. can be obtained as the return value 1 by carrying out the directory manipulation syntax.

On the other hand, if the attribute vale is acquired in one entry unit, the directory manipulation syntax 5 given by following formula (1-3) is specified.

Search (base entry name=A Inc., search scope=subtree, search condition=all company staff classes, the attribute name=no object, return value 1)     (1-3)

153 in FIG. 15 shows an example in which the directory manipulation instruction is described by LDAP. If the subtree is selected as the search scope (Scope), the staff entry is set to the search object as the leaf entry which is the lowermost entry of the directory tree.

Using the return value 1 obtained by execution of formula (1-3), a plurality of entry unit manipulation syntax's are combined, as indicated by following formulas (1-4) to (1-7).

The list of the staff entry in A Inc. can be derived as the return value 1 by executing formula (1-3). First, as the entry unit manipulation, the top entry is designated from the entry list by following formula (1-4).

The return value 2=First-entry(return value 1)     (1-4)

The attribute of the general name can be extracted from the top entry obtained by formula (1-4) by the manipulation given in following formula (1-5).

Get-value(attribute value=general name, return value 2)  (1-5)

In addition, the attribute of the general name can be extracted by formula (1-7) by designating the next entry by the manipulation given in following formula (1-6).

The return value 3=Next-entry(return value 2)  (1-6)

Get-value(attribute value=general name, return value 2)  (1-7)

By applying the similar manipulation repeatedly in entry unit to all entries in the entry list, the attributes can be acquired in entry unit.

Next, details of the union operation for the company directory in FIG. 11 will be explained.

First, the view search instruction 11 given by following formula (1-8) is inputted into the directory manipulation translation unit 12 as the view search instruction 11 from the application 10.

Search (search scope=sales and development union view, the search condition=all, return value)  (1-8)

Next, the view definition syntax whose view name is defined as the "sales and development union view" and which is given by following formula (1-9) is searched from the view definition syntax sets 3.

Define view sales and development union view as union( Search (base entry=sales, search scope=one level, search condition=all, return value 1) Search (base entry=development, search scope= one level, search condition=all, return value 2)  (1-9)

In the above formula (1-9), the union operation "Union" is designated as the set operation name. Based on the view definition syntax and the corresponding view search instruction translation rule, first the directory manipulation instruction 13 given by following formula (1-10) is generated.

Search (base entry=sales, search scope=one level, search condition=all, return value 1)  (1-10)

A plurality of entry unit directory manipulation instructions 15 given by formula (1-11) to formula (1-14) are generated by using this return value 1.

Return value 1-1=Firts-entry(return value 1)  (1-11)

Get-value(attribute value=general name, return value 1-1)  (1-12)

Return value 1-2=Next-entry(return value 1-1)  (1-13)

Get-value(attribute value=general name, return value 1-2)  (1-14)

These entry unit directory manipulation instructions 15 are manipulated repeatedly to all entries in the entry list detected by the return value 1.

Similarly as above, the directory manipulation instruction 13 given by following Expression (1-15) is generated.

Search (base entry=development, search scope=one level, search condition=all, return value 2)  (1-15)

A plurality of entry unit directory manipulation instructions 15 given by formula (1-16) to formula (1-19) are generated by using this return value 2.

Return value 2-1=Firts-entry(return value 2)  (1-16)

Get-value(attribute value=general name, return value 2-1)  (1-17)

Return value 2-2=Next-entry(return value 2-1)  (1-18)

Get-value(attribute value=general name, return value 2-2)  (1-19)

These entry unit directory manipulation instructions 15 are manipulated repeatedly to all entries in the entry list detected by the return value 2.

The directory batch processing unit 14 transmits the entry unit directory manipulation instructions 15 which can be processed by the directory manipulation unit 17 (formula (1-11) to formula (1-14), formula (1-16) to formula (1-19)) to the directory manipulation unit 17. The directory manipulation unit 17 acquires the entry unit manipulation reply 18 indicated by following formula (1-20) to formula (1-21).

Return value 1-1="Jiro Tanaka", return value 1-2="Saburo Yamada", return value 1-3="Hanako Sato"  (1-20)

Return value 2-1="Shiro Takahashi", return value 2-2="Saburo Yamada"  (1-21)

The directory batch processing unit 14 generates the directory set operation instruction 19 given by formula (1-22) from the entry unit manipulation reply 18 in order to carry out the union operation which is the set operation defined by the view definition syntax given by formula (1-9).

Return value 3=union ((return value 1), (return value 2))  (1-22)

In this case, the return value 1 and the return value 2 are top pointers in the entry lists obtained by formula (1-20), formula (1-21) respectively.

The directory set operation unit 20 carries out the directory set operation instruction 19 in the above formula (1-22), and then returns the result of the union operation given by following formula (1-23) to the application 10 as the view manipulation reply.

Return value 3=("Jiro Tanaka", "Saburo Yamada", "Hanako Sato", "Shiro Takahashi")  (1-23)

As shown in FIG. 13, the directory set operation unit 20 generates the view manipulation reply as the view directory 131. The display unit 22 displays the view directory 131 appropriately.

Next, the case where the view directory 21 is generated from a plurality of directories by the union operation will be explained with reference to FIG. 16A to FIG. 20B.

If, in two directories, the sets of classes and attributes of all upper entries from the first entry, which is located in the first directory as the main directory, to the root entry are equal to those of all upper entries from the second entry, which is located in the second directory as the subsidiary directory, to the root entry, then one view directory can be obtained by the union operation on the basis of the first entry and the second entry with respect to the first directory and the second directory. In other words, the directory in which the lower entry of the second entry on the second directory as the subsidiary directory is added to the lower entry of the first entry on the first directory as the main directory can be defined as the virtual view directory based on the union operation.

Figure 16A:
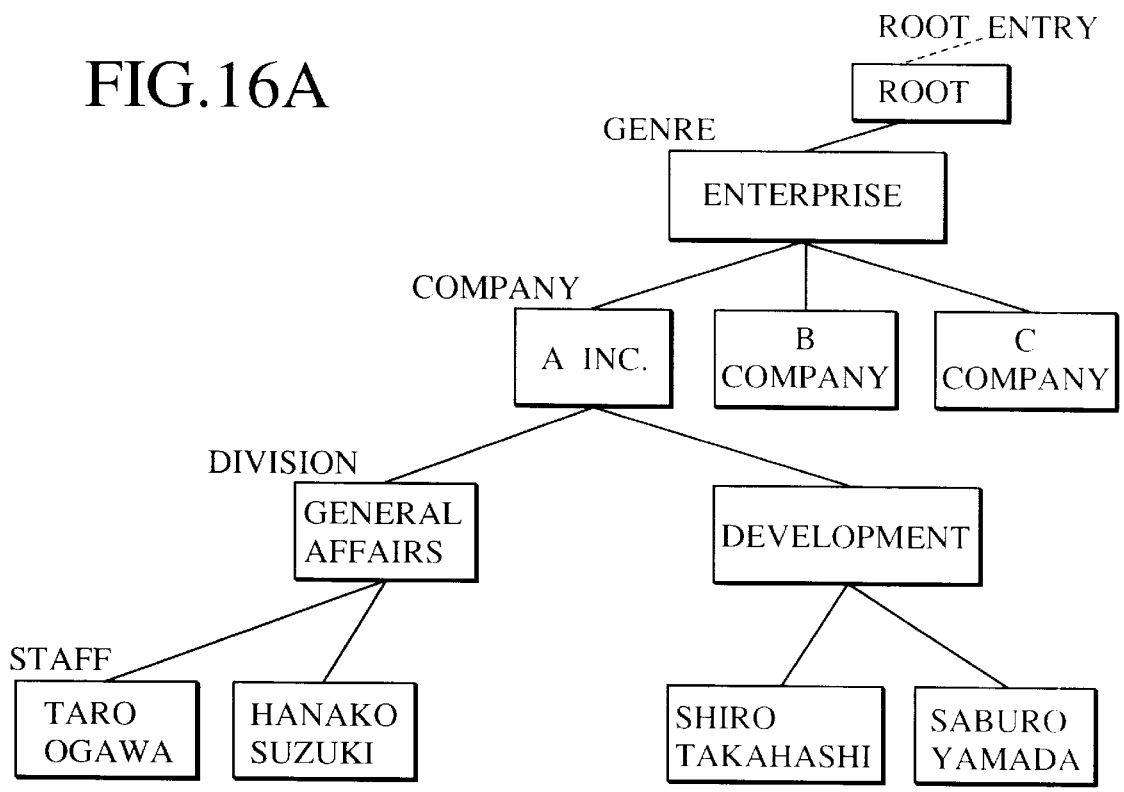
FIGS. 16A and 16B are views showing an example of two content directories as the object of the union operation respectively.
Figure 16B:
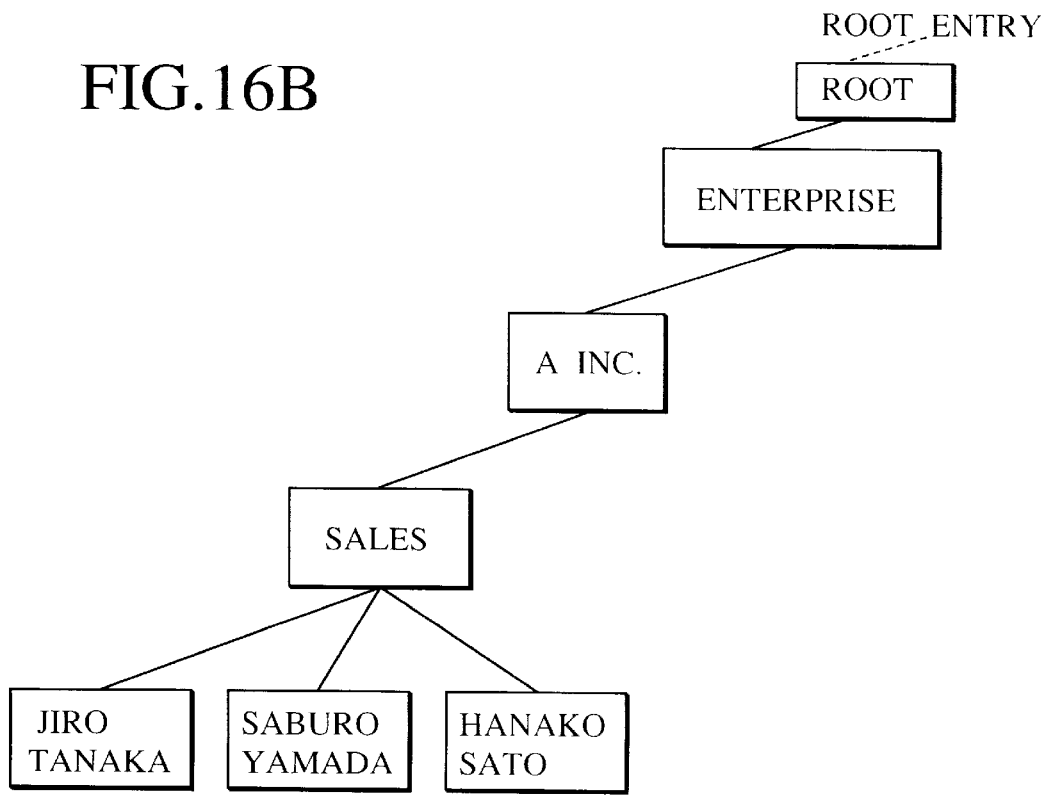

FIG. 16A shows the company directory as the main directory, and FIG. 16B shows the A Inc. sales directory as the subsidiary directory. If the base entry in the union operation of these two directories is assumed as "A Inc. entry", as shown in FIG. 18, the view definition syntax given by following formula (2-1) can be described.

Define view enterprise all division view as union( dir=company
  directory base=cn=A Inc., cn=enterprise, cn=root dir=A Inc.
  sales directory )                                              (2-1)

Figure 17:
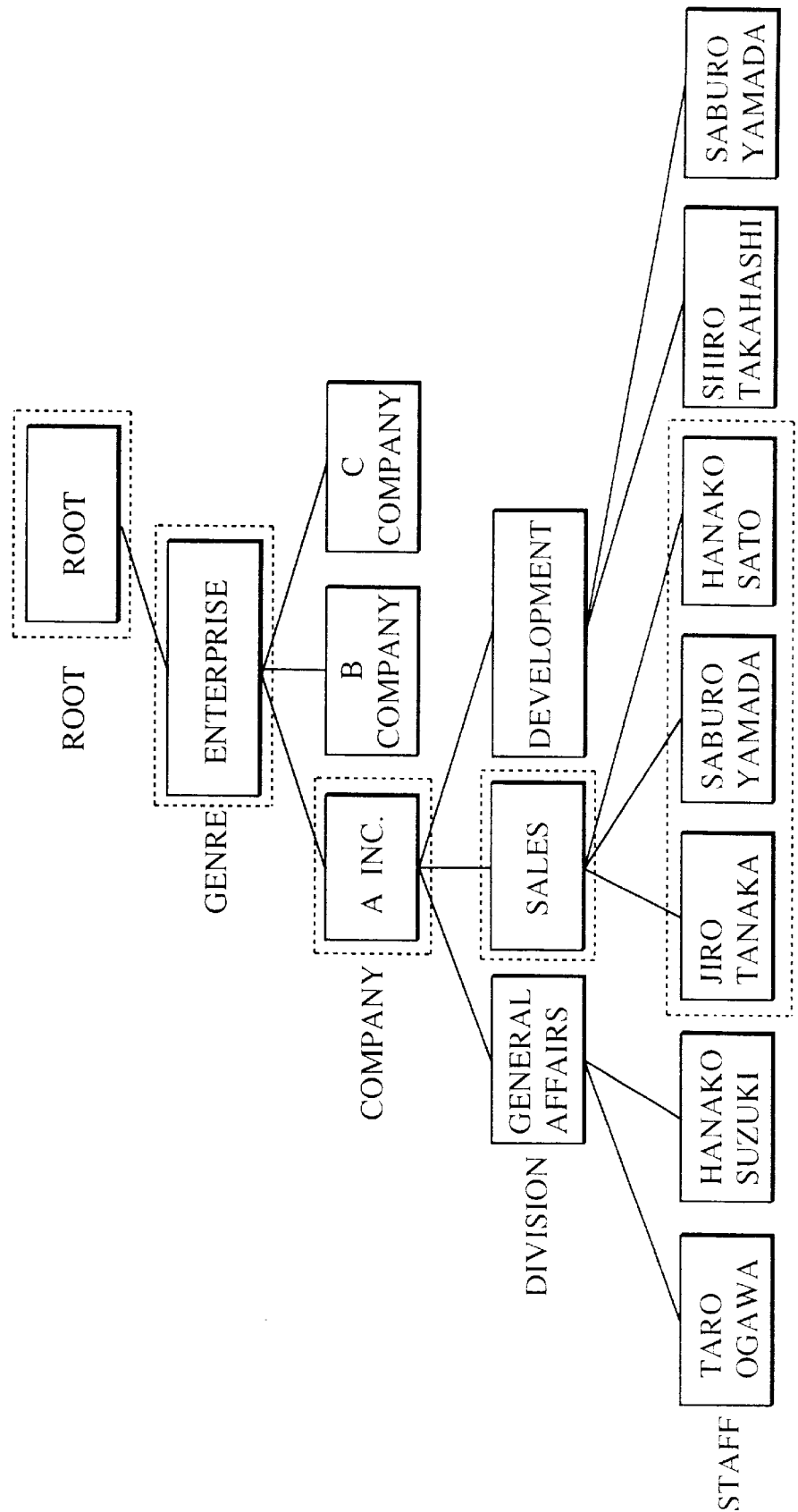
FIG. 17 is a view showing an example of the view directory of all divisions of the company derived from the directories in FIGS. 16A and 16B.

FIG. 17 shows the view directory 171 of the "enterprise all division view" obtained by the view definition syntax shown in formula (2-1).

The view search instruction translation rule corresponding to the view definition syntax is described.

FIG. 18A shows the view search instruction for the union operation which handles two directories as the object. FIG. 18B shows the base directory ("base") and the search scope ("scope") designated by the view instruction in FIG. 18A.

Here the view search instruction 11 shown in following formula (2-2) and in FIG. 19A is inputted in response to the enterprise all division view in FIG. 19B.

Search( dir=enterprise all division view base=cn=A Inc., cn=enterprise, cn=root, scope=subtree, filter=NULL attrs=NULL return
)                                                                (2-2)

Here the "dir" denotes the objective view name for operation, and the "base" denotes the base entry identifier in view search. The "scope" denotes the search scope, the "filter" denotes the search condition, and the value "NULL" denotes no restricting condition. The "attrs" denotes the attribute acquired by the search, and the value "NULL" denotes to acquire all attributes. The "return" denotes the return value.

The view search instruction translation processes are applied to the view search instruction 11 given by the above formula (2-2) to translate them into the directory manipulation instructions 13. More particularly, the directory manipulation instructions 13 given by following formulas (2-3) and (2-4) are generated and carried out with respect to the enterprise directory in FIG. 20A and the A Inc. sales division directory in FIG. 20B Search( dir=enterprise directory, base=cn=A Inc., cn=enterprise,
  cn=root, scope=subtree, filter=NULL attrs=NULL return )   (2-3)

Search( dir=A Inc. sales directory base=cn=A Inc., cn=enterprise,
  cn=root, scope=subtree, filter=NULL attrs=NULL return )   (2-4)

Note that since the base entry of the union operation (base=cn=A Inc., cn=enterprise, cn=root) is acquired twice by the directory manipulation instructions 13 given by both formulas (2-3) and (2-4), one of them is deleted.

The directory manipulation process is carried out based on the above directory manipulation instructions 13, and then the sets of the classes and attributes of the directories are output as the view search result from two directories.

In the view search instruction translating process shown in FIG. 5, since the "enterprise all division view" is designated as the view definition syntax identifier in formula (2-2), the view definition syntax given by formula (2-1) can be derived if the view definition syntax sets are searched according to the view definition syntax identifier (step S401). Then, the view search instruction translation rule corresponding to the set operation is searched according to the set operation name described in the view definition syntax (step S403). In the formula (2-1), the "union" is designated as the set operation name and also two directories are designated as the operation object. Therefore, it is understood that this view definition syntax should be the view definition syntax in which the union operation of two directories is defined. The view search instruction translation rule given by following formula (2-5) can be applied to the view search instruction 11 given by formula (2-2).

If [the union operation object is two unions], then if [scope of the view search instruction is subtree], then if [base entry of the view search instruction is an upper entry rather than the base entry of the union operation, or the base entry of the view search instruction and the base entry of the union operation are the same entry], then search( dir=$1, base=$2, scope=$3, filter=NULL, attrs=NULL return

)

search( dir=$4, base=$2, scope=$3, filter=NULL, attrs=NULL return

)

else [if the base entry of the view search instruction is lower than the base entry of the union operation], then search( dir=$1, base=$2, scope=$3, filter=NULL, attrs=NULL return

)

search( dir=$4, base=$2, scope=$3, filter=NULL, attrs=NULL return

)

```
       end if end if

. . .

end if

)                                                    (2-5)
```

Note that the value described in the view definition syntax and the view search instruction 11 is substituted into $1, $2, $3, $4 in the above formula (2-5) as the argument.

Next, the view search instruction translation rule defined in formula (2-5) is applied to the view definition syntax given by formula (2-1) and the view search instruction 11 given by formula (2-2), then the main directory name in formula (2-1) is substituted into $1 in formula (2-5), the base entry identification name of the view search instruction in formula (2-2) is substituted into $2 in formula (2-5), the search scope of the view search instruction in formula (2-2) is substituted into $3 in formula (2-5), and the subsidiary directory name in formula (2-1) is substituted into $4 in formula (2-5).

Here, since the base entry of the union operation in formula (2-1) is identical to the base entry of the view search instruction in formula (2-2), the directory manipulation instructions in formula (2-3) and formula (2-4) are generated (step S405). In this case, the above view search instruction translation rule may be varied appropriately according to the type of the set operation, the search scope, the base entry, etc.

In the view directory generating process in FIG. 6, the directory manipulation instruction 13 is divided into the entry unit manipulation instructions 15 (step S501), and then the entries which satisfy the search condition are searched in entry unit (steps S503, S505, S507). The union operation, which is defined by the view definition syntax, is carried out between resultant entry sets requested here (step S501), and then the view directory is output as the result of the view search in the form of the tree structure.

In this union operation, the directory set operation unit 20 acquires two entry sets as the operation object and the operation name as the union operation as the parameter of the inputted directory set operating instruction. These two entry sets are stored in the table format buffers which have the attribute (attribute series) of one entry in each row, respectively. The results of the Cartesian product operation, which can be derived by combining the entries in two table format buffers individually and totally in row unit, are stored in another table format buffer. The directory set operation unit 20 specifies the entries which contain the identical relative identification name and the identical attribute value mutually in one row of the table format buffers storing the results of the Cartesian product operation, and then selects the sets which are derived from the table format buffers, which store all entries contained in two entry sets as the results of the Cartesian product, except the entries, which have the same specified content and belong to one entry set, as the result of the view search of the union operation.

Figure 21:
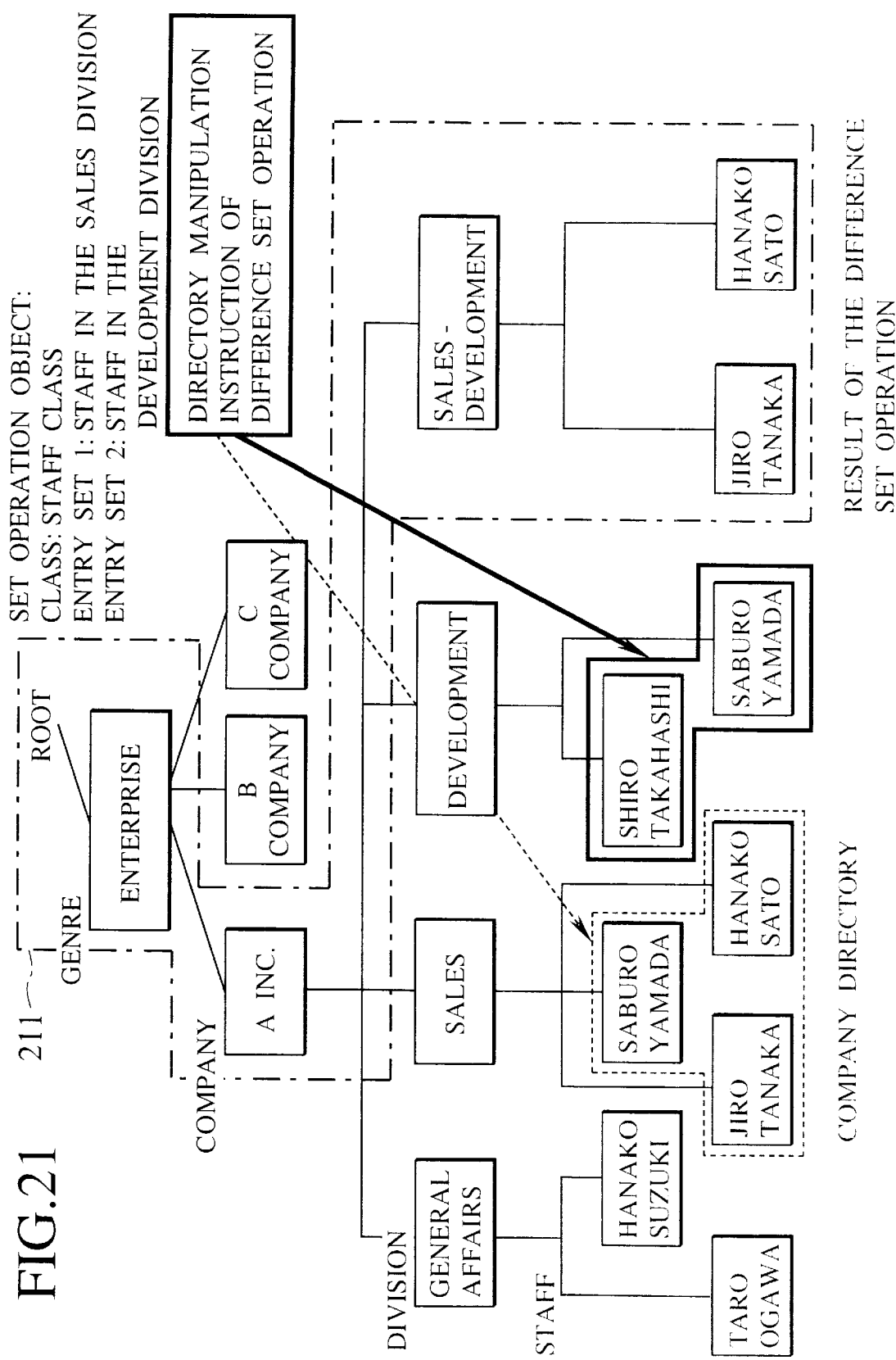
FIG. 21 is a view showing an example of the view directory derived by a difference operation from the company directory in FIG.11.

Next, the case where the view directory is generated by the difference operation which cuts out the information from the company directory in FIG. 11 in entry unit will be explained with reference to FIG. 21.

For example, the entry set which is the difference set between the staff entry set 1 of the "sales division" and the staff entry set 2 of the "development division" is cut out by using the difference operation from the company directory in FIG. 11. The input view search instruction is translated into the directory manipulation instruction concerning difference operation via the similar procedures to the above. "Jiro Tanaka", "Saburo Yamada", "Hanako Sato", which are the staff entry of the "sales division" and "Shiro Takahashi" and "Saburo Yamada", which are the staff entry of the "development division" are searched from the company directory as the staff entry set 1 and the staff entry set 2 respectively. The entry which belongs to the staff entry set 1 but does not belong to the staff entry set 2 are cut out in compliance with the difference operation specified by the view definition syntax, then the staff entries of "Jiro Tanaka" and "Hanako Sato" can be derived. These two staff entries are bound directly below the difference set operation entry. The view directory being output from the directory set operation unit 20 is indicated by 211.

The directory set operation unit 20 acquires two entry sets as the operation object and the operation name as the difference operation as the parameter of the inputted directory set operation instruction. These two entry sets are stored in the table format buffers which have the attribute (attribute series) of one entry in each row, respectively. The results of the Cartesian product operation, which can be derived by combining the entries in two table format buffers individually and totally in row unit, are stored in another table format buffer. The directory set operation unit 20 specifies the entries which contain the identical relative identification name and the identical attribute value mutually in one row of the table format buffers storing the results of the Cartesian product operation, and then selects the sets which are derived from all entries, which are contained in the minuend entry set, except the entries, which have the same specified content and belong to the minuend entry set, as the view search result of the difference operation.

Figure 22:
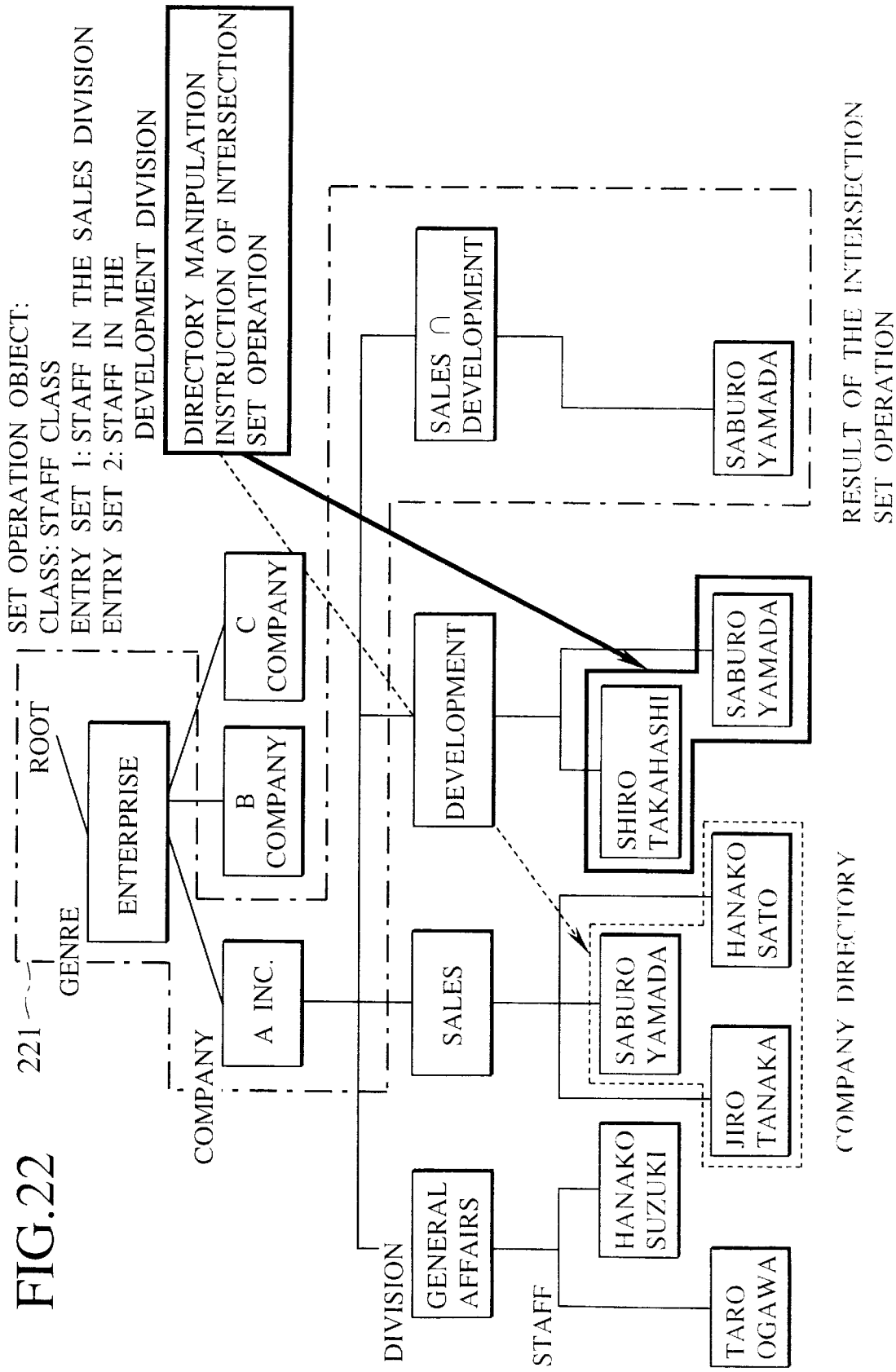
FIG. 22 is a view showing an example of the view directory derived by a intersection operation from the company directory in FIG. 11.

Next, the case where the view directory is generated by the intersection operation which cuts out the information from the company directory in FIG. 11 in entry unit will be explained with reference to FIG. 22.

For example, the entry set which is the intersection set between the staff entry set 1 of the "sales division" and the staff entry set 2 of the "development division" is cut out by using the intersection operation from the company directory in FIG. 11. The inputted view search instruction is translated into the directory manipulation instruction concerning the intersection operation via the similar procedures to the above. "Jiro Tanaka", "Saburo Yamada", and "Hanako Sato", which are the staff entry of the "sales division" and "Shiro Takahashi" and "Saburo Yamada", which are the staff entry of the "development division" are searched from the company directory as the staff entry set 1 and the staff entry set 2 respectively. The entry which belongs to both the staff entry set 1 and the staff entry set 2 are cut out in compliance with the intersection operation specified by the view definition syntax, then the staff entry of "Saburo Yamada" can be derived. This staff entry is bound directly below the intersection operation entry. The view directory being output from the directory set operating portion 20 is indicated by 221.

In the intersection operation, the directory set operation unit 20 gets two entry sets as the operation object and the operation name as the intersection operation as the parameter of the inputted directory set operation instruction. These two entry sets are stored in the table format buffers which have the attribute (attribute series) of one entry in each row, respectively. The results of the Cartesian product operation, which can be derived by combining the entries individually and totally in two table format buffers in row unit, are stored in another table format buffer. The directory set operation unit 20 specifies the entries which are contained in two table format buffers corresponding to two entry sets respectively and include the identical relative identification name and the identical attribute value mutually in one row, and then selects the specified entry set which belongs to any one of two entry sets as the view search result of the intersection operation.

Next, the case where the view directory is generated by the Cartesian product operation which cuts out the information from the company directory in FIG. 11 in entry unit will be explained with reference to FIG. 23.

Figure 23:
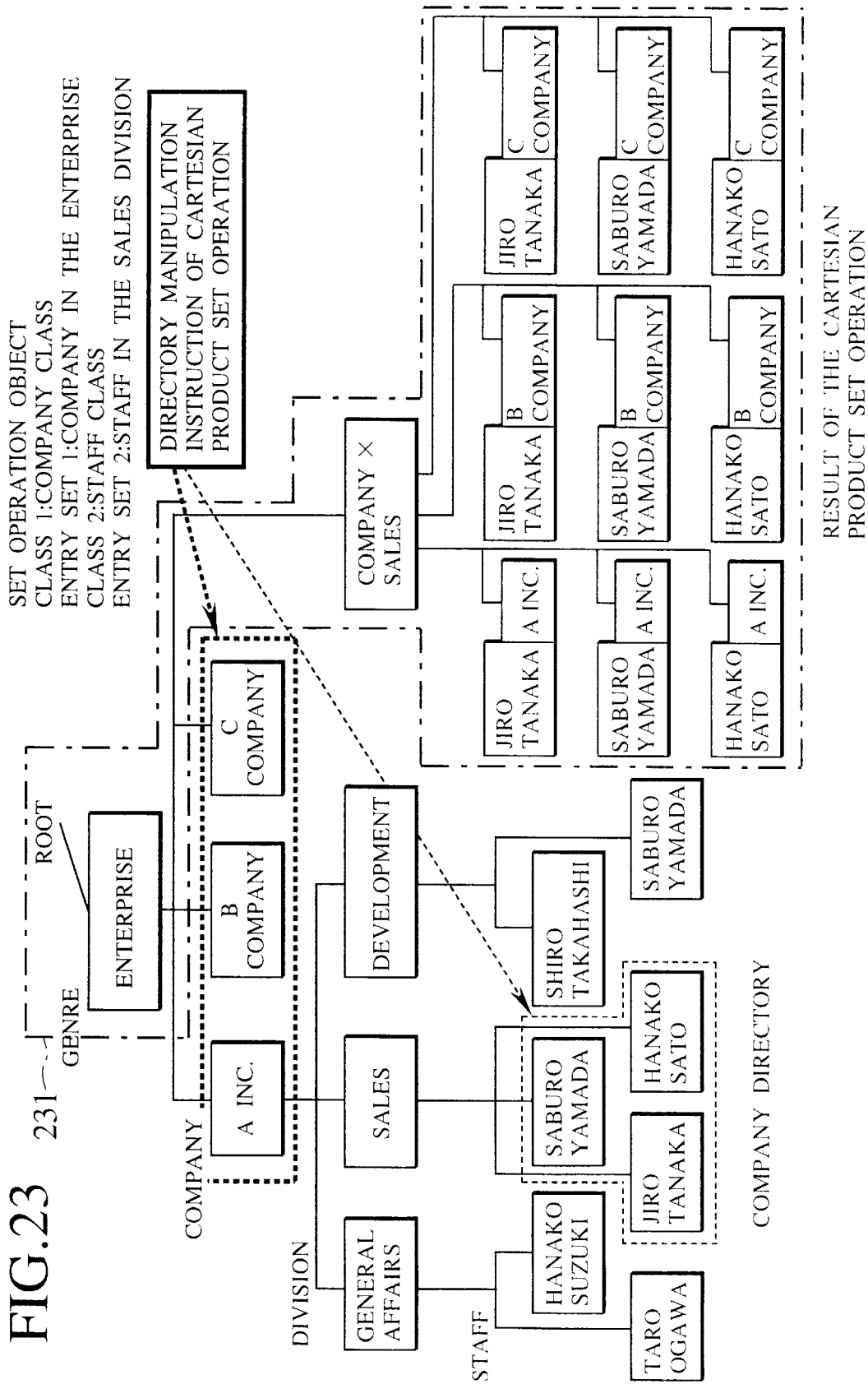
FIG. 23 are views showing an example of the view directory derived by a Cartesian product operation from the company directory in FIG. 11 respectively.

For example, as shown in FIG. 23, the entry set which is the Cartesian product set between the company entry set 1 in the company class on the directory and the staff entry set 2 of the "sales division" in the staff class on the directory is cut out by using the Cartesian product operation from the company directory in FIG. 11. The inputted view search instruction 11 is translated into the directory manipulation instruction of the Cartesian product operation via the similar procedures to the above. "A Inc.", "B Company", "C Company",which are the company entry, and "Jiro Tanaka", "Saburo Yamada", and "Hanako Sato", which are the staff entry of the "sales division" are searched from the company directory as the entry set 1 and the entry set 2 respectively. As shown in FIG. 23B, the entry sets of new entries which have all entry attributes of two entry sets are generated by combining the entry set 1 and the entry set 2 individually and totally in compliance with the Cartesian product operation specified by the view definition syntax. These new entry sets are bound directly below the Cartesian product operation entry. The view directory being output from the directory set operating portion 20 is indicated by 231.

In the Cartesian product operation, the directory set operation unit 20 acquires two entry sets as the operation object and the operation name as the Cartesian product operation as the parameter of the inputted directory operation instruction. These two entry sets are stored in the table format buffers which have the attribute (attribute series) of one entry in each row, respectively. The results of the Cartesian product operation, which can be derived by combining the entries in two table format buffers individually and totally in row unit, are stored in another table format buffer. The directory set operation unit 20 selects the entry sets, which are stored in the table format buffers for storing the operation result, as the view search result of the Cartesian product.

Next, the case where the view directory is generated by the projection operation which cuts out the information from the company directory in FIG. 11 in attribute unit will be explained with reference to FIG. 24A to FIG. 25B. The projection operation is an operation for cutting out necessary attributes from the entries constituting nodes of the directory tree to derive the view directory consisting of the entries including the cut-out attributes only.

Figures 24A, 24B, 24C, 24D:
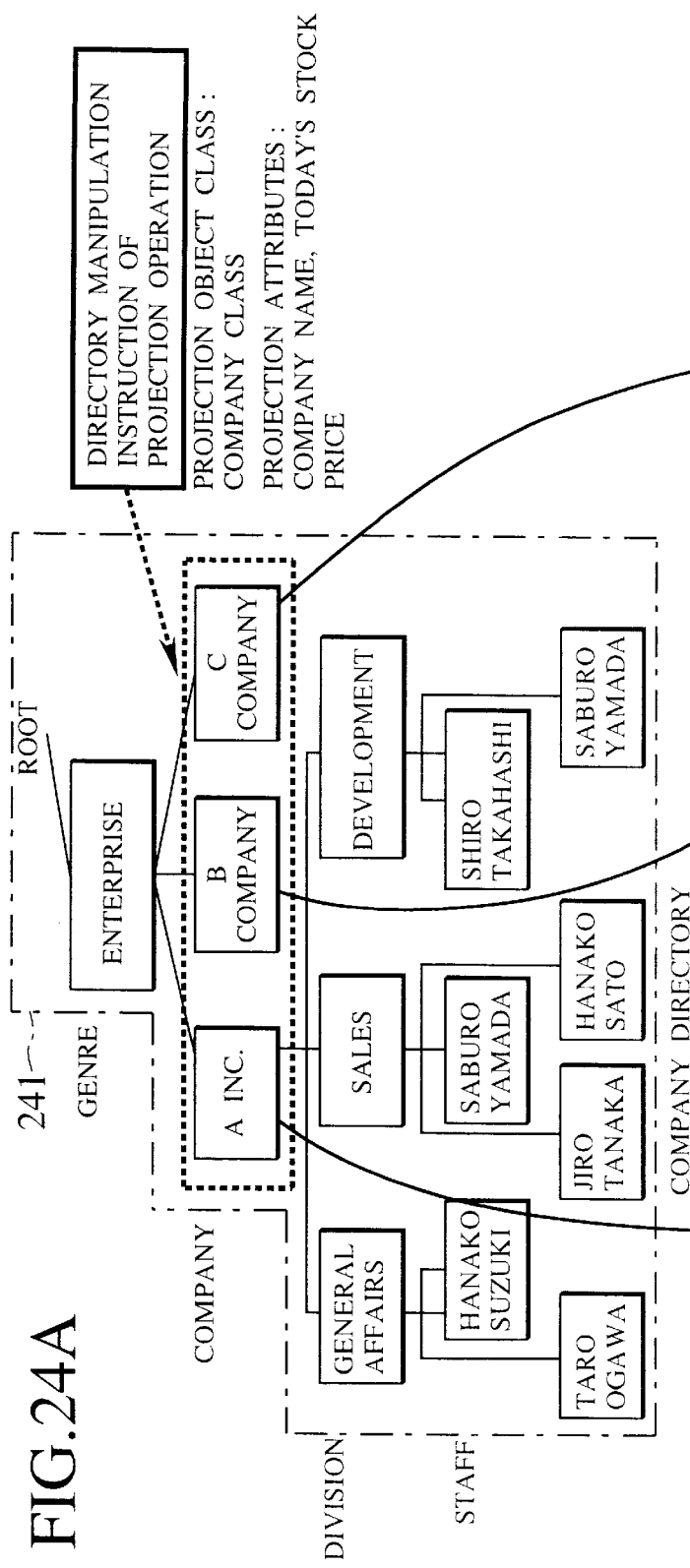
FIGS. 24A to 24D are views showing an example of the view directory derived by a projection operation from the company directory in FIG. 11 respectively.

For example, as shown in FIG. 24A, the sets whose attribute type is the "company name" and whose attribute type is "today's stock price" in all entries in the company class on the directory are cut out by using the projection operation from the company directory in FIG. 11. The inputted view search instruction 11 is translated into the directory manipulation instruction 13 of the projection operation via the similar procedures to the above. As indicated by bold lines in FIGS. 24B, 24C and 24D, only the attributes "company name" and "today's stock price" out of the attributes of the entries in the company class shown in FIG. 12A are selected as the manipulation object. Remaining attributes "object class" and "yesterday's stock price" are out of the manipulation object. The entry sets of new entries which have only the attributes "company name" and "today's stock price" are generated in compliance with the projection operation specified by the view definition syntax. The view directory being output from the directory set operation unit 20 is indicated by 241.

FIG. 25 shows an example of the projection operation without upper sections of the directory. As shown in FIG. 25B, "A Inc." in the company class, which is positioned in the middle of the hierarchical structure of the company directory, is set as the base entry in the view definition syntax. According to the definition of this projection operation, the partial directory tree which is located below the necessary hierarchy is cut out from the content directory having a number of hierarchies to show as the view directory 251.

Employing these projection set operations, a function for limiting the access scope to be manipulated can be implemented such that only the necessary attributes of the entries can be made visible but the attributes with high security can be made invisible, etc. In addition, if the projection object classes are set to the first hierarchy class and the third hierarchy class in the three hierarchy content directory, for example, the number of the search manipulation can be reduced to come up to the target entry.

Next, the case where the view directory is generated by the selection operation which cuts out the information from the company directory in FIG. 11 in entry unit will be explained with reference to FIG. 26A to FIG. 27B. The selection operation is an operation for designating the selection condition in connection with the attributes of the entry sets constituting nodes of the directory tree to thus derive the view directory consisting of the entries which satisfy the selection condition.

For example, as shown in FIG. 26E, the sets of the entries whose attribute type as the selection attribute condition is the ("today's stock price" and whose attribute value is higher than 50 ("today's stock price>50") in all entries in the company class on the directory are cut out by using the selection operation from the company directory in FIG. 11. Note that, when the conditions relating to a plurality of attributes are imposed as the selection condition, a plurality conditions may be connected by the logical product or the logical sum. The inputted view search instruction 11 is translated into the directory manipulation instruction 13 of the selection operation via the similar procedures to the above. Out of the entries "A Inc.", "B Company", and "C Company" in the company class shown in FIG. 26A, only "A Inc." shown in FIG. 26B and "B Company" shown in FIG. 26C are selected as the manipulation object. On the other hand, "C Company" which is the entry not being stisfying the selection condition shown in FIG. 26D is out of the manipulation object. The entry sets of new entries which are composed only of the entries belonging to "A Inc." and "B Company" are generated in compliance with the selection operation specified by the view definition syntax. The view directory being outputted from the directory set operation unit 20 is indicated by 261.

FIG. 27B shows the definition in the case that selection of the entry whose division name in the division class is "sales division" is designated in the view definition syntax. According to the definition of the selection operation, as shown in FIG. 27A, the entry belonging to the entry in which "division name"="sales division" is cut out to show as the view directory 271.

Employing the selection operation, only the necessary entries which satisfy the selection condition can be shown by designating the condition associated with the attributes.

Next, the case where the view directory is generated by the join operation which binds the related information between the attributes of the company directory in FIG. 11 will be explained with reference to FIGS. 28A to FIG. 28E. If the attributes of mutual entries have the association in one directory or between a plurality of directory trees, the join operation is an operation for designating the joining condition between two object classes using the entry set which is grouped by the object class having the association as one unit to thus derive the view directory consisting of sets of the entries which satisfy the joining condition.

For example, as shown in FIG. 28E, it can be defined as given in following formula (3-1) to contain "B Company" in the "customer" attribute as the joining condition between the "company name" attribute in the "B Company" entry in the company class on the company directory and the "customer" attribute in the "staff" entry in the staff class.

$$\text{(attribute value of the "customer" attribute in the "staff" entry)} \subseteq \text{(attribute value of the "company name" attribute in the "B Company" entry)} \quad (3\text{-}1)$$

The inputted view search instruction 11 is translated into the directory manipulation instruction 13 of the join operation via the similar procedures to the above. According to the above joining condition, the "B Company" entry is referred to and at the same time the "staff" entry in the "sales" entry of the division class is also referred to. Out of the "staff" entry below the "sales" entry, only "Jiro Tanaka" shown in FIG. 28B and "Saburo Yamada" shown in FIG. 28C are selected as the manipulation object in accordance with the join operation specified by the view definition syntax. In this case, all "staff" entries in the other entries of the division class are extracted. A new entry set consisting of these entries is generated. On the other hand, "Hanako Sato" entry which does not satisfy the above joining condition is out of the manipulation object. The view directory being outputted from the directory set operation unit 20 is indicated by 281.

Next, the case where the particular entry sets which are bound directly below one entry in the class on the directory are cut out from the company directory in FIG. 11, and then the view directory is generated by the aggregation operation which binds directly below one entry in other classes will be explained with reference to FIGS. 29A and 29B.

For example, as shown in FIG. 29A, all staff entries below the "sales" entry are bound immediately below the "A Inc." entry in the company class. In the view definition syntax, all staff entries of the "sales" entry are designated as the aggregation object entry and also the "A Inc." entry is designated as the aggregation base entry. The inputted view search instruction is translated into the directory manipulation instruction of the aggregation operation via the similar procedures to the above. FIG. 29B shows the view directory 291 obtained by applying the aggregation operation to the entry sets of "Jiro Tanaka", "Saburo Yamada", and "Hanako Sato" which are derived by the directory manipulation. According to the execution of the aggregation operation, no entry exists directly below the "sales" entry, but "Jiro Tanaka", "Saburo Yamada" and "Hanako Sato" are bound directly below the "A Inc." entry as the "staff" entry.

Employing this aggregation operation, the directory trees in which hierarchies of the directory trees of the content directory are aggregated can be shown as the directory trees.

The directory set operation unit 20 stores all entries, which can be achieved by integrating the resultant entry unit manipulation replies, into the table format buffers which include the attribute of one entry in one row, then forms the batch view manipulation reply in answer to the directory manipulation instruction by adding the entry sets in the table format buffers to the directory tree of the content directory, and then returns this batch view manipulation reply to the application 10 in the form of the view directory.

Note that, above mentioned projection operation can be handled as an operation which cut out a directory tree constituting an acquired entry set which has a prescribed depth in the directory tree from a whole content directory tree without upper section, middle section, or lower section. In this time, this aggregation operation is equivalent to the projection operation without middle section of the content directory, thus is one embodiment of the projection operation In the above explanation of each set operations, the portions which are explained as the manipulation in entry unit can be carried out by the manipulation in unit of the object class via the similar procedures. Also, more various view directories can be achieved flexibly by defining the above set operations appropriately in combination in respective view definition syntax.

Figure 30:
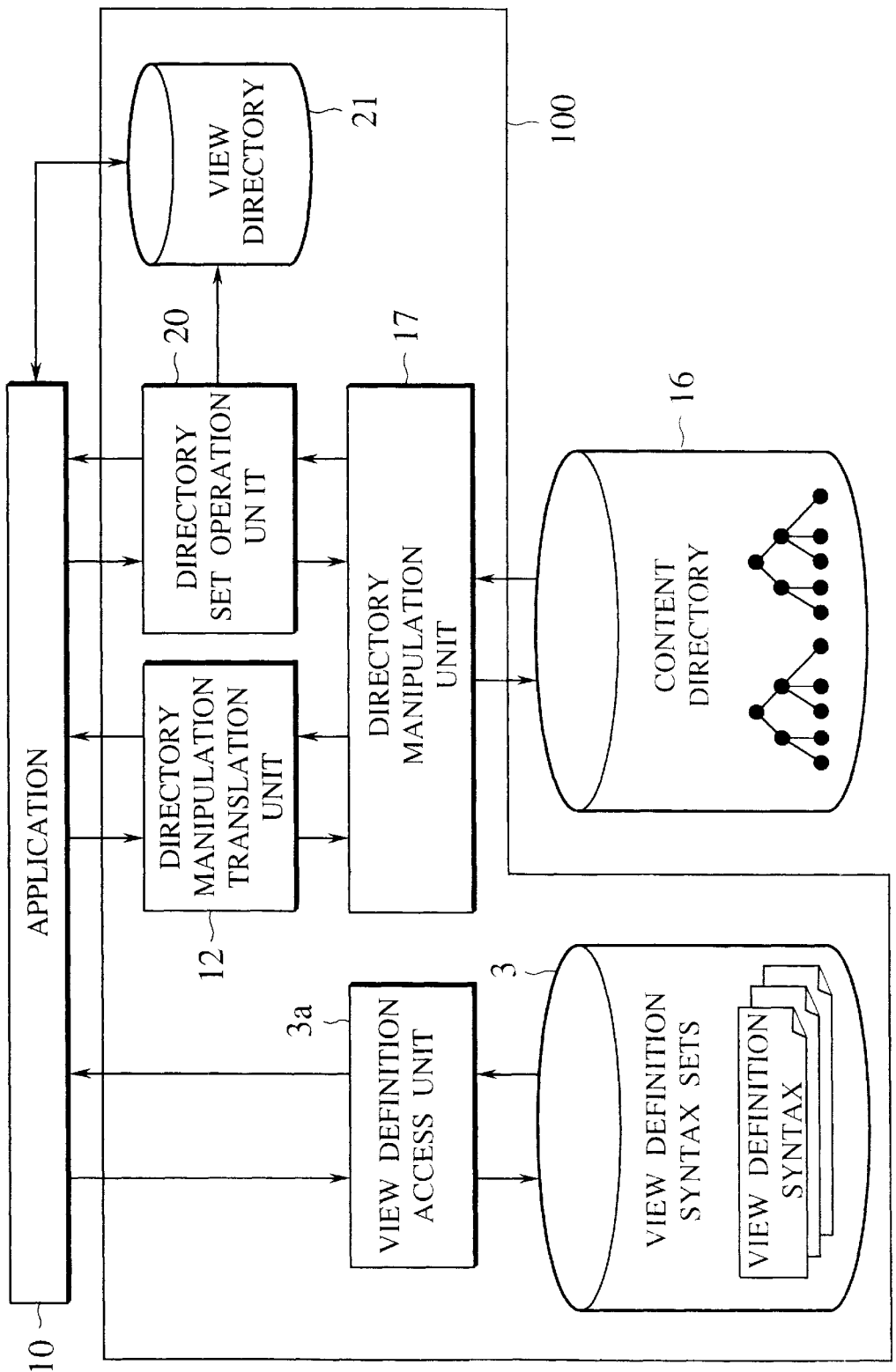
FIG. 30 is a view showing an example of a system configuration of a directory access apparatus according to an embodiment of the present invention.

FIG. 30 shows an example of a system structure of the scheme for access directory according to this embodiment of the present invention. The directory access apparatus 100 according to this embodiment can be implemented by a single computer or by connecting a plurality of computers, and connected to the applications 10 locally or via the network. The directory access apparatus 100 according to this embodiment manipulates a group of content directories distributed on the network such as the Internet, etc., and then accesses the data (contents) which are sorted and managed by the content directories to derive the view directory 21. The derived view directory 21 become the manipulation object of the applications as the virtual directories which are customized for easy employment of the applications 10. The view definition syntax sets 3 and the view search translation rule 6 employed to derive the view directory may be referred to as the database or the file, otherwise may be developed on the memory of the computer to which the directory access apparatus is incorporated if necessary. In addition, in the directory set operation unit 20, in order to carry out each of set operations, the table format buffer may be provided appropriately on the inside or the outside to store intermediate data therein.

In summary, according to the present invention, the working efficiency of the process of cutting out only the desired information on the content directories and the working efficiency of the process of simplifying the manipulation of the related information on the content directories can be reduced significantly rather than the case where the applications sharing the directories are developed respectively. In addition, the security protection can be enhanced by combining appropriately the function of limiting the access scope to be manipulated on the directory, the user certifying function, etc., for example, by providing the access authority to every view definition syntax.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of accessing a substantial directory for storing and managing data, comprising the steps of:

(a) inputting a view search instruction for manipulating data, which is defined by a combination of arbitrary class and attribute requested by an application;

(b) translating the view search instruction into a directory manipulation instruction for manipulating one or a plurality of substantial directories according to a prescribed view definition which defines application dedicated view as a set operation with respect to the substantial directory;

(c) extracting entries from the substantial directories using the directory manipulation instruction to derive an entry set;

(d) generating a directory set operation instruction including the entry set and the set operation based on a relational algebra defined in the view definition; and (e) generating a tree-structured hypothetical directory corresponding to the view search instruction of the application, the hypothetical directory being customized per application so as to be directly utilized by the application, by executing the directory set operation instruction per every operation type to the entry set.

2. The method of claim 1, further comprising the step of:

(e) providing the customized directory obtained by the step (d) as a tree structure which is formed by coupling a plurality of entries hierarchically.

3. The method of claim 1, wherein the step (b) includes the steps of:

(b1) searching a view definition corresponding to a view definition identifier designated by the view search instruction;

(b2) searching a view search instruction translation rule corresponding to the set operation described in the searched view definition; and (b3) generating the directory manipulation instruction by applying a searched view search instruction translation rule to the view search instruction and a searched view definition.

4. The method of claim 1, wherein the step (c) includes the steps of:

(c1) translating the directory manipulation instruction into an entry manipulation instruction which manipulates the substantial directories in entry unit;

(c2) extracting the entry by manipulation of entries in the substantial directories, using the entry manipulation instruction; and (c3) collecting all entries extracted by the step (c2) to form the entry set.

5. The method of claim 1, wherein the step (d) generates the customized directory by carrying out the set operation containing at least one of a union operation, a difference operation, an intersection operation, a Cartesian product operation, a projection operation, a selection operation, a join operation, and an aggregation operation defined in the view definition.

6. The method of claim 1, further comprising the steps of:

(f) generating the view definition in which a view definition identifier is attached to a directory manipulation syntax which contains at least a directory manipulation word specifying one or a plurality of set operations, and class and attribute of the substantial directories as a manipulation object; and (g) storing a generated view definition in a view definition set.

7. A method of accessing a substantial directory for sorting and managing data that joins entries which stores sets of attribute types and attribute values as a tree structure based on a structure of an object class, comprising the steps of:

(aa) generating a view definition in which a view definition identifier is attached to a directory manipulation syntax which contains at least a directory manipulation word specifying one or a plurality of set operations, and class and attribute of the substantial directories as a manipulation object;

(bb) storing a generated view definition in a view definition set;

(cc) inputting a view search instruction for manipulating data, which is defined by a combination of arbitrary class and attribute requested by an application;

(dd) specifying a directory manipulation syntax having the view definition identifier described in the view search instruction from the view definition set and translating the view search instruction into a directory manipulation instruction which acquires collectively attribute values of entry sets requested by the view search instruction by manipulating one or a plurality of substantial directories;

(ee) translating the directory manipulation instruction into an entry unit manipulation instruction for manipulating the substantial directories in entry unit;

(ff) extracting entries from the substantial directories using the entry unit manipulation instruction to derive an entry set as a batch directory manipulation result and generating a directory set operation instruction including the entry set and a set operation defined by the view definition; and (gg) generating a customized directory corresponding to the view search instruction of the application according to a combination of the class and the attribute as a result of the set operation by executing the directory set operation instruction.

8. The method of claim 7, wherein the step (gg) further includes the steps of:

(gg1) acquiring an operation name as a union and two entry sets as the operation object from the directory set operation instruction if the set operation designated in the directory set operation is a union operation which cuts out all entries contained in both of two entry sets in one class or more on the substantial directory respectively;

(gg2) storing the two entry sets into table format first and second buffers having an attribute series contained in one entry in one row respectively;

(gg3) storing a Cartesian product operation result which is obtained by combining the table format first and second buffers individually and totally in row unit into a table format third buffer;

(gg4) specifying mutually identical entries in the table format third buffer; and (gg5) generating entry sets which are derived by removing entries which have specified identical contents and belong to one entry set from the third buffer which stores all entries contained in the two entry sets as the customized directory which is subjected to the union operation.

9. The method of claim 7, wherein the step (gg) further includes the steps of:

(gg11) acquiring an operation name as a difference and two entry sets as the operation object from the directory set operation instruction if the set operation designated in the directory set operation is a difference operation which cuts out entry sets belonging to one entry set but not belonging to the other entry set from two entry sets in one class or more on the substantial directory;

(gg12) storing the two entry sets into table format first and second buffers having an attribute series contained in one entry in one row respectively;

(gg13) storing a Cartesian product operation result which is obtained by combining the table format first and second buffers individually and totally in row unit into a table format third buffer;

(gg14) specifying mutually identical entries in the table format third buffer; and (gg15) generating entry sets which are derived by removing entries which have specified identical contents and belong to one minuend entry set in the tow entry sets from all entries being contained the other minuend entry set in the two entry set as the customized directory which is subjected to the difference operation.

10. The method of claim 7, wherein the step (gg) further includes the steps of:

(gg21) acquiring an operation name as an intersection and two entry sets as the operation object from the directory set operation instruction if the set operation designated in the directory set operation is an intersection operation which cuts out entry sets contained in both two entry sets in one class or more on the substantial directory;

(gg22) storing the two entry sets into table format first and second buffers having an attribute series contained in one entry in one row respectively;

(gg23) storing a Cartesian product operation result which is obtained by combining the table format first and second buffers individually and totally in row unit into a table format third buffer;

(gg24) specifying mutually identical entries in the third buffer; and (gg25) generating entry sets which are contained in both the first and second buffers as the customized directory which is subjected to the intersection operation.

11. The method of claim 7, wherein the step (gg) further includes the steps of:

(gg31) acquiring an operation name as a Cartesian product and two entry sets as the operation object from the directory set operation instruction if the set operation designated in the directory set operation is the Cartesian product operation which cuts out entry sets having all attributes in two class entries on the substantial directory;

(gg32) storing two entry sets into table format first and second buffers having an attribute series contained in one entry in one row respectively;

(gg33) storing a Cartesian product operation result which is obtained by combining the table format first and second buffers individually and totally in row unit into a table format third buffer; and (gg34) generating entry sets which are stored in the third buffer as the customized directory which is subjected to the Cartesian product operation.

12. An apparatus for accessing a substantial directory for storing and managing data, comprising:

(a) a unit for inputting a view search instruction for manipulating data, which is defined by a combination of arbitrary class and attribute requested by an application;

(b) a unit for translating the view search instruction into a directory manipulation instruction for manipulating one or a plurality of substantial directories according to a prescribed view definition which defines application dedicated view as a set operation with respect to the substantial directory;

(c) a unit for extracting entries from the substantial directories using the directory manipulation instruction to derive an entry set;

(d) a unit for generating a directory set operation instruction including the entry set and the set operation based on a relational algebra defined in the view definition; and (e) a unit for generating a tree-structure hypothetical directory corresponding to the view search instruction of the application, the hypothetical directory being customized per application so as to be directly utilized by the application, by executing the directory set operation instruction per every operation type to the entry set.

13. The apparatus of claim 12, further comprising:

(e) a unit for providing the customized directory obtained by the unit (d) as a tree structure which is formed by coupling a plurality of entries hierarchically.

14. The apparatus of claim 12, wherein the unit (b) includes:

(b1) a unit for searching a view definition corresponding to a view definition identifier designated by the view search instruction;

(b2) a unit for searching a view search instruction translation rule corresponding to the set operation described in the searched view definition; and (b3) a unit for generating the directory manipulation instruction by applying a searched view search instruction translation rule to the view search instruction and a searched view definition.

15. The apparatus of claim 12, wherein the unit (c) includes:

(c1) a unit for translating the directory manipulation instruction into an entry manipulation instruction which manipulates the substantial directories in entry unit;

(c2) a unit for extracting the entry by manipulation of entries in the substantial directories, using the entry manipulation instruction; and (c3) a unit for collecting all entries extracted by the unit (c2) to form the entry set.

16. The apparatus of claim 12, wherein the unit (d) generates the customized directory by carrying out the set operation containing at least one of a union operation, a difference operation, an intersection operation, a Cartesian product operation, a projection operation, a selection operation, a join operation, and an aggregation operation defined in the view definition.

17. The apparatus of claim 12, further comprising:

(f) a unit for generating the view definition in which a view definition identifier is attached to a directory manipulation syntax which contains at least a directory manipulation word specifying one or a plurality of set operations, and class and attribute of the substantial directories as a manipulation object; and (g) a unit for storing a generated view definition in a view definition set.

18. A apparatus for accessing a substantial directory for sorting and managing data that joins entries which stores sets of attribute types and attribute values as a tree structure based on a structure of an object class, comprising:

(aa) a unit for generating a view definition in which a view definition identifier is attached to a directory manipulation syntax which contains at least a directory manipulation word specifying one or a plurality of set operations, and class and attribute of the substantial directories as a manipulation object;

(bb) a unit for storing a generated view definition in a view definition set;

(cc) a unit for inputting a view search instruction for manipulating data, which is defined by a combination of arbitrary class and attribute requested by an application;

(dd) a unit for specifying a directory manipulation syntax having the view definition identifier described in the view search instruction from the view definition set and translating the view search instruction into a directory manipulation instruction which acquires collectively attribute values of entry sets requested by the view search instruction by manipulating one or a plurality of substantial directories;

(ee) a unit for translating the directory manipulation instruction into an entry unit manipulation instruction for manipulating the substantial directories in entry unit;

(ff) a unit for extracting entries from the substantial directories using the entry unit manipulation instruction to derive an entry set as a batch directory manipulation result and generating a directory set operation instruction including the entry set and a set operation defined by the view definition; and (gg) a unit for generating a customized directory corresponding to the view search instruction of the application according to a combination of the class and the attribute as a result of the set operation by executing the directory set operation instruction.

19. The apparatus according to claim 18, wherein the unit (gg) further includes:

(gg1) a unit for acquiring an operation name as a union and two entry sets as the operation object from the directory set operation instruction if the set operation designated in the directory set operation is a union operation which cuts out all entries contained in both of two entry sets in one class or more on the substantial directory respectively;

(gg2) a unit for storing the two entry sets into table format first and second buffers having an attribute series contained in one entry in one row respectively;

(gg3) a unit for storing a Cartesian product operation result which is obtained by combining the table format first and second buffers individually and totally in row unit into a table format third buffer;

(gg4) a unit for specifying mutually identical entries in the table format third buffer; and (gg5) a unit for generating entry sets which are derived by removing entries which have specified identical contents and belong to one entry set from the third buffer which stores all entries contained in the two entry sets as the customized directory which is subjected to the union operation.

20. The apparatus of claim 18, wherein the unit (gg) further includes:

(gg11) a unit for acquiring an operation name as a difference and two entry sets as the operation object from the directory set operation instruction if the set operation designated in the directory set operation is a difference operation which cuts out entry sets belonging to one entry set but not belonging to the other entry set from two entry sets in one class or more on the substantial directory;

(gg12) a unit for storing the two entry sets into table format first and second buffers having an attribute series contained in one entry in one row respectively;

(gg13) a unit for storing a Cartesian product operation result which is obtained by combining the table format first and second buffers individually and totally in row unit into a table format third buffer;

(gg14) a unit for specifying mutually identical entries in the table format third buffer; and (gg15) a unit generating entry sets which are derived by removing entries which have specified identical contents and belong to one minuend entry set from all entries being contained the other minuend entry set in the two entry sets as the customized directory which is subjected to the difference operation.

21. The apparatus of claim 18, wherein the unit (gg) further includes:

(gg21) a unit for acquiring an operation name as an intersection and two entry sets as the operation object from the directory set operation instruction if the set operation designated in the directory set operation is an intersection operation which cuts out entry sets contained in both two entry sets in one class or more on the substantial directory;

(gg22) a unit for storing the two entry sets into table format first and second buffers having an attribute series contained in one entry in one row respectively;

(gg23) a unit for storing a Cartesian product operation result which is obtained by combining the table format first and second buffers individually and totally in row unit into a table format third buffer;

(gg24) a unit for specifying mutually identical entries in the third buffer; and (gg25) a unit for generating entry sets which are contained in both the first and second buffers as the customized directory which is subjected to the intersection operation.

22. The apparatus of claim 18, wherein the unit (gg) further includes:

(gg31) a unit for acquiring an operation name of Cartesian product and two entry sets as the operation object from the directory set operation instruction if the set operation designated in the directory set operation is the Cartesian product operation which cuts out entry sets having all attributes in two class entries on the substantial directory;

(gg32) a unit for storing two entry sets into table format first and second buffers having an attribute series contained in one entry in one row respectively;

(gg33) a unit for storing a Cartesian product operation result which is obtained by combining the table format first and second buffers individually and totally in row unit into a table format third buffer; and (gg34) a unit for generating entry sets which are stored in the third buffer as the customized directory which is subjected to the Cartesian product operation.

23. A computer-readable recording medium for causing a computer to execute an access processing of a substantial directory for storing and managing data, the processing including:

(a) a process for inputting a view search instruction for manipulating data, which is defined by a combination of arbitrary class and attribute requested by an application;

(b) a process for translating the view search instruction into a directory manipulation instruction for manipulating one or a plurality of substantial directories according to a prescribed view definition which defines application dedicated view as a set operation with respect to the substantial directory;

(c) a process for extracting entries from the substantial directories using the directory manipulation instruction to derive an entry set;

(d) a process for generating a directory set operation instruction including the entry set and the set operation based on a relational algebra defined in the view definition; and (e) a process for generating a tree-structured hypothetical directory corresponding to the view search instruction of the application, the hypothetical directory being customized per application so as to be directly utilized by the application, by executing the directory set operation instruction per every operation type to the entry set.

24. The recording medium of claim 23, the processing further including:

(e) a process for providing the customized directory obtained by the process (d) as a tree structure which is formed by coupling a plurality of entries hierarchically.

25. The recording medium of claim 23, wherein the process (b) includes:

(b1) a process for searching a view definition corresponding to a view definition identifier designated by the view search instruction;

(b2) a process for searching a view search instruction translation rule corresponding to the set operation described in the searched view definition; and (b3) a process for generating the directory manipulation instruction by applying a searched view search instruction translation rule to the view search instruction and a searched view definition.

26. The recording medium of claim 23, wherein the process (c) includes:

(c1) a process for translating the directory manipulation instruction into an entry manipulation instruction which manipulates the substantial directories in entry unit;

(c2) a process for extracting the entry by manipulation of entries in the substantial directories, using the entry manipulation instruction; and (c3) a process for collecting all entries extracted by the process (c2) to form the entry set.

27. The recording medium of claim 23, wherein the process (d) generates the customized directory by carrying out the set operation containing at least one of a union operation, a difference operation, an intersection operation, a Cartesian product operation, a projection operation, a selection operation, a join operation, and an aggregation operation defined in the view definition.

28. The recording medium of claim 23, the processing further comprising:

(f) a process for generating the view definition in which a view definition identifier is attached to a directory manipulation syntax which contains at least a directory manipulation word specifying one or a plurality of set operations, and class and attribute of the substantial directories as a manipulation object; and (g) a process for storing a generated view definition in a view definition set.

29. A computer-readable recording medium for causing a computer to execute an access processing of a substantial directory for sorting and managing data that joins entries which stores sets of attribute types and attribute values as a tree structure based on a structure of an object class, the processing including:

(aa) a process for generating a view definition in which a view definition identifier is attached to a directory manipulation syntax which contains at least a directory manipulation word specifying one or a plurality of set operations, and class and attribute of the substantial directories as a manipulation object;

(bb) a process for storing a generated view definition in a view definition set;

(cc) a process for inputting a view search instruction for manipulating data, which is defined by a combination of arbitrary class and attribute requested by an application;

(dd) a process for specifying a directory manipulation syntax having the view definition identifier described in the view search instruction from the view definition set and translating the view search instruction into a directory manipulation instruction which acquires collectively attribute values of entry sets requested by the view search instruction by manipulating one or a plurality of substantial directories;

(ee) a process for translating the directory manipulation instruction into and entry unit manipulation instruction for manipulating the substantial directories in entry unit;

(ff) a process for extracting entries from the substantial directories using the entry unit manipulation instruction to derive an entry set as a batch directory manipulation result and generating a directory set operation instruction including the entry set and a set operation defined by the view definition; and (gg) a process for generating a customized directory corresponding to the view search instruction of the application according to a combination of the class and the attribute as a result of the set operation by executing the directory set operation instruction.

30. The recording medium of claim 29, wherein the process (gg) further includes:

(gg1) a process for acquiring an operation name as a union and two entry sets as the operation object from the directory set operation instruction if the set operation designated in the directory set operation is a union operation which cuts out all entries contained in both of two entry sets in one class or more on the substantial directory respectively;

(gg2) a process for storing the two entry sets into table format first and second buffers having an attribute series contained in one entry in one row respectively;

(gg3) a process for storing a Cartesian product operation result which is obtained by combining the table format first and second buffers individually and totally in row unit into a table format third buffer;

(gg4) a process for specifying mutually identical entries in the table format third buffer; and (gg5) a process for generating entry sets which are derived by removing entries which have specified identical contents and belong to one entry set from the third buffer which stores all entries contained in the two entry sets as the customized directory which is subjected to the union operation.

31. The recording medium of claim 29, wherein the process (gg) further includes:
- (gg11) a process for acquiring an operation name as a difference and two entry sets as the operation object from the directory set operation instruction if the set operation designated in the directory set operation is a difference operation which cuts out entry sets belonging to one entry set but not belonging to the other entry set from two entry sets in one class or more on the substantial directory;
- (gg12) a process for storing the two entry sets into table format first and second buffers having an attribute series contained in one entry in one row respectively;
- (gg13) a process for storing a Cartesian product operation result which is obtained by combining the table format first and second buffers individually and totally in row unit into a table format third buffer;
- (gg14) a process for specifying mutually identical entries in the table format third buffer; and
- (gg15) a process for generating entry sets which are derived by removing entries which have specified identical contents and belong to one minuend entry set from all entries being contained the other minuend entry set in the two entry set as the customized directory which is subjected to the difference set operation.

32. The recording medium of claim 29, wherein the process (gg) further includes:
- (gg21) a process for acquiring an operation name as an intersection and two entry sets as the operation object from the directory set operation instruction if the set operation designated in the directory set operation is an intersection operation which cuts out entry sets contained in both two entry sets in one class or more on the substantial directory;
- (gg22) a process for storing the two entry sets into table format first and second buffers having an attribute series contained in one entry in one row respectively;
- (gg23) a process for storing a Cartesian product operation result which is obtained by combining the table format first and second buffers individually and totally in row unit into a table format third buffer;
- (gg24) a process for specifying mutually identical entries in the third buffer; and
- (gg25) a process for generating entry sets which are contained in both the first and second buffers as the customized directory which is subjected to the intersection operation.

33. The recording medium of claim 29, wherein the process (gg) further includes:
- (gg31) a process for acquiring an operation name as a Cartesian product and two entry sets as the operation object from the directory set operation instruction if the set operation designated in the directory set operation is the Cartesian product operation which cuts out entry sets having all attributes in two class entries on the substantial directory;
- (gg32) a process for storing two entry sets into table format first and second buffers having an attribute series contained in one entry in one row respectively;
- (gg33) a process for storing a Cartesian product operation result which is obtained by combining the table format first and second buffers individually and totally in row unit into a table format third buffer; and
- (gg34) a process for generating entry sets which are stored in the third buffer as the customized directory which is subjected to the Cartesian product operation.

34. A method of accessing a substantial directory for storing and managing data, comprising the steps of:
- (a) generating a view definition in which a view definition identifier is attached to the directory manipulation syntax which contains at least a directory manipulation word specifying one or a plurality of set operations, and class and attribute of the substantial directories as a manipulation object;
- (b) inputting a view search instruction for manipulating data, which is defined by a combination of arbitrary class and attribute requested by an application;
- (c) translating the view search instruction into an entry unit directory manipulation instruction for manipulating one or a plurality of substantial directories in entry unit according to the view definition;
- (d) extracting entries from the substantial directories using the entry unit directory manipulation instruction to derive an entry set as a batch directory manipulation result; and
- (e) generating a customized directory corresponding to the view search instruction of the application based on a combination of the class and the attribute as a result of a set operation, by applying the set operation defined in the view definition to the entry set.

35. A unit for accessing a substantial directory for storing and managing data, comprising:
- (a) a unit for generating a view definition in which a view definition identifier is attached to a directory manipulation syntax which contains at least a directory manipulation word specifying one or a plurality of set operations, and class and attribute of the substantial directories as a manipulation object;
- (b) a unit for inputting a view search instruction for manipulating data, which is defined by a combination of arbitrary class and attribute requested by an application;
- (c) a unit for translating the view search instruction into an entry unit directory manipulation instruction for manipulating one or a plurality of substantial directories in entry unit according to the view definition;
- (d) a unit for extracting entries from the substantial directories using the entry unit directory manipulation instruction to derive an entry set as a batch directory manipulation result; and
- (e) a unit for generating a customized directory corresponding to the view search instruction of the application based on a combination of the class and the attribute as a result of a set operation, by applying the set operation defined in the view definition to the entry set.

36. A computer-readable recording medium for causing a computer to execute an access processing of a substantial directory for storing and managing data, the processing including:
- (a) a unit for generating a view definition in which a view definition identifier is attached to a directory manipulation syntax which contains at least a directory manipulation word specifying one or a plurality of set operations, and class and attribute of the substantial directories as a manipulation object;
- (b) a unit for inputting a view search instruction for manipulating data, which is defined by a combination of arbitrary class and attribute requested by an application;

(c) a unit for translating the view search instruction into an entry unit directory manipulation instruction for manipulating one or a plurality of substantial directories in entry unit according to the view definition;

(d) a unit for extracting entries from the substantial directories using the entry unit directory manipulation instruction to derive an entry set as a batch directory manipulation result; and (e) a unit for generating a customized directory corresponding to the view search instruction of the application based on a combination of the class and the attribute as a result of a set operation, by applying the set operation defined in the view definition to the entry set.

* * * * *